(12) United States Patent
Matono

(10) Patent No.: US 7,092,207 B2
(45) Date of Patent: Aug. 15, 2006

(54) THIN FILM MAGNETIC HEAD AND METHOD OF MANUFACTURING THE SAME

(75) Inventor: Naoto Matono, Saku (JP)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 232 days.

(21) Appl. No.: 10/864,008

(22) Filed: Jun. 8, 2004

(65) Prior Publication Data

US 2004/0223264 A1 Nov. 11, 2004

Related U.S. Application Data

(62) Division of application No. 10/028,088, filed on Dec. 21, 2001, now Pat. No. 6,747,842.

(30) Foreign Application Priority Data

Dec. 26, 2000 (JP) ............................ 2000-395517

(51) Int. Cl.
 *G11B 5/147* (2006.01)
(52) U.S. Cl. .................................................. 360/126
(58) Field of Classification Search ................ None
 See application file for complete search history.

(56) References Cited

U.S. PATENT DOCUMENTS 6,747,842 B1 * 6/2004 Matono ...................... 360/126

* cited by examiner

*Primary Examiner*—David Davis
(74) *Attorney, Agent, or Firm*—Kenyon & Kenyon LLP

(57) ABSTRACT

A thin film magnetic head and a method of manufacturing the same allowing miniaturization of a magnetic pole width with high precision are provided. After forming a first insulating layer portion having an opening between a thin film coil and a position corresponding to the ABS to cover the thin film coil, a second insulating layer portion is formed to cover at least this opening. A top pole is then formed on the second insulating layer portion. Because part of the second insulating layer portion is provided in the opening, the surface of the second insulating layer portion is positioned lower at the portion corresponding to the opening region as compared to the configuration where no opening is disposed in the first insulating layer portion. As a result, the apex angle is reduced, thereby making it possible to miniaturize a tip portion of the top pole with high precision.

1 Claim, 26 Drawing Sheets

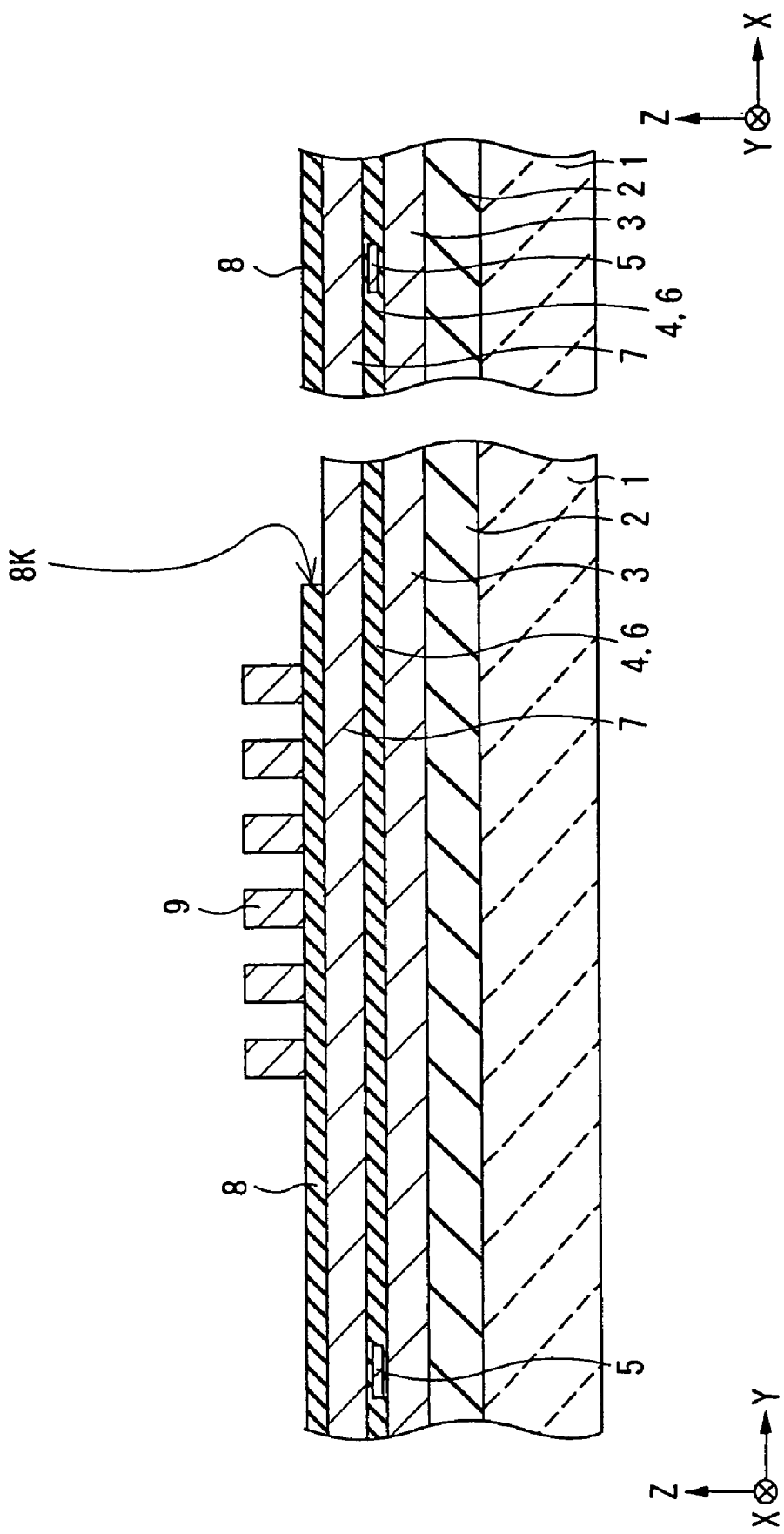

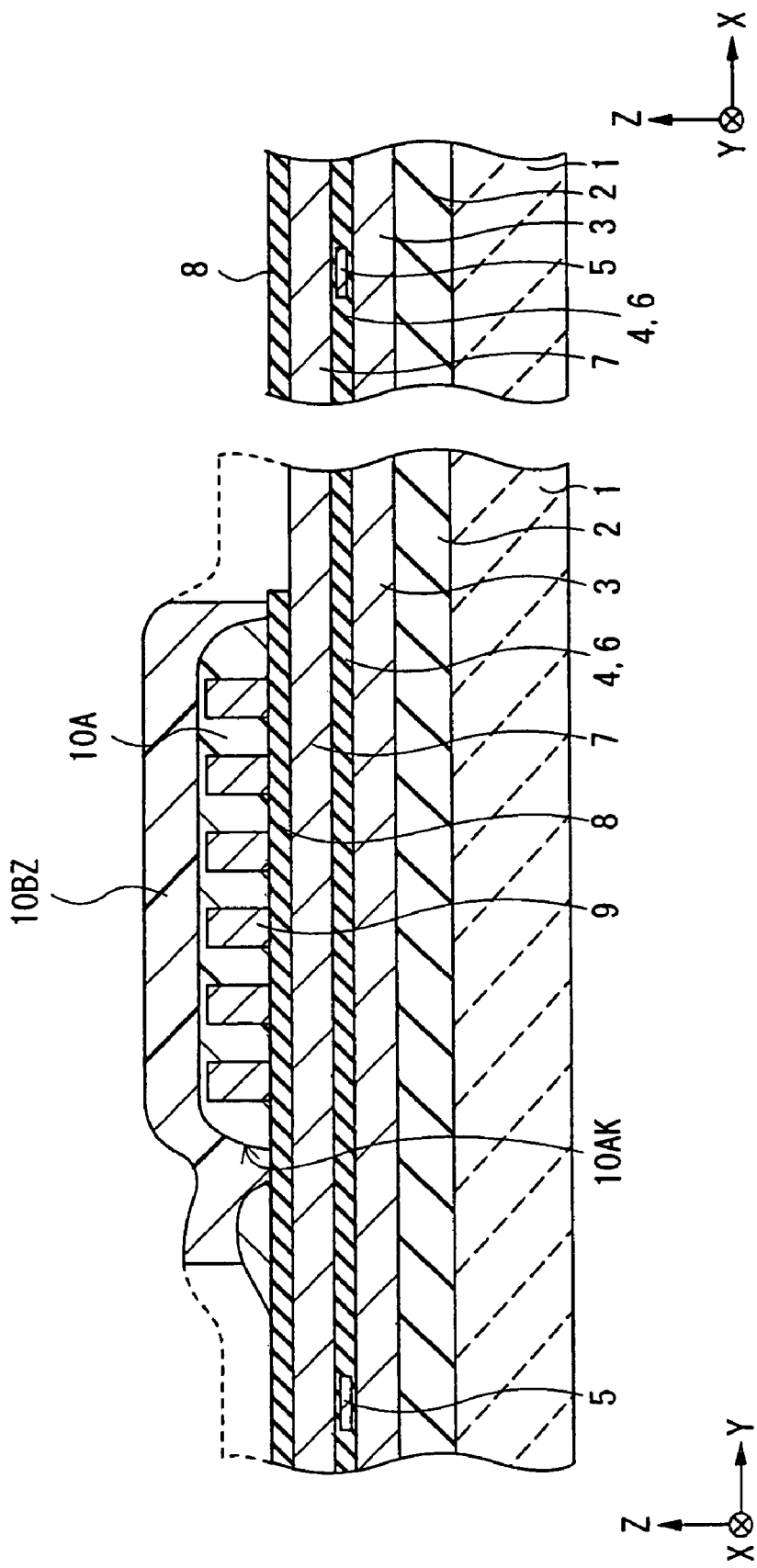

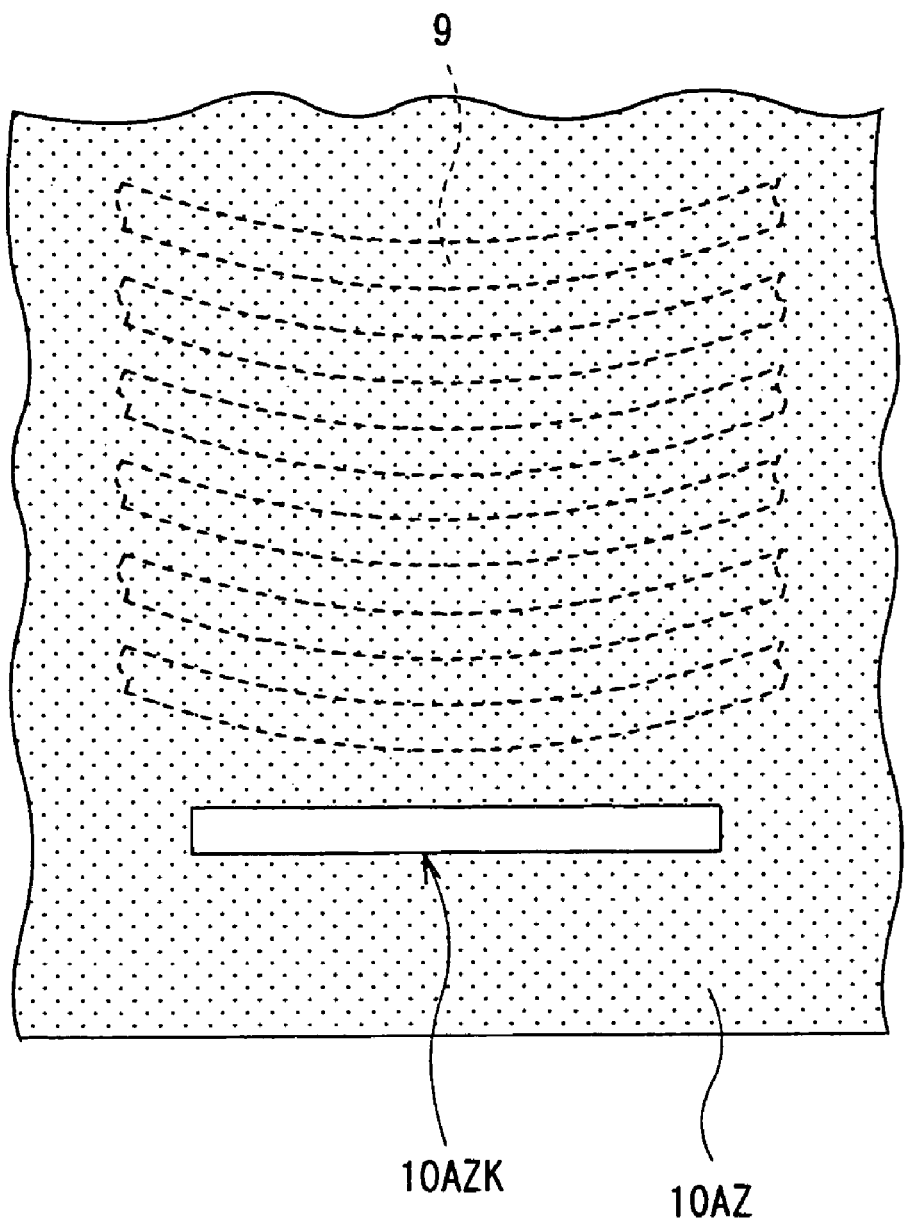
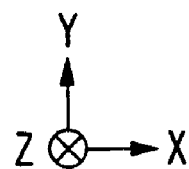
FIG. 10

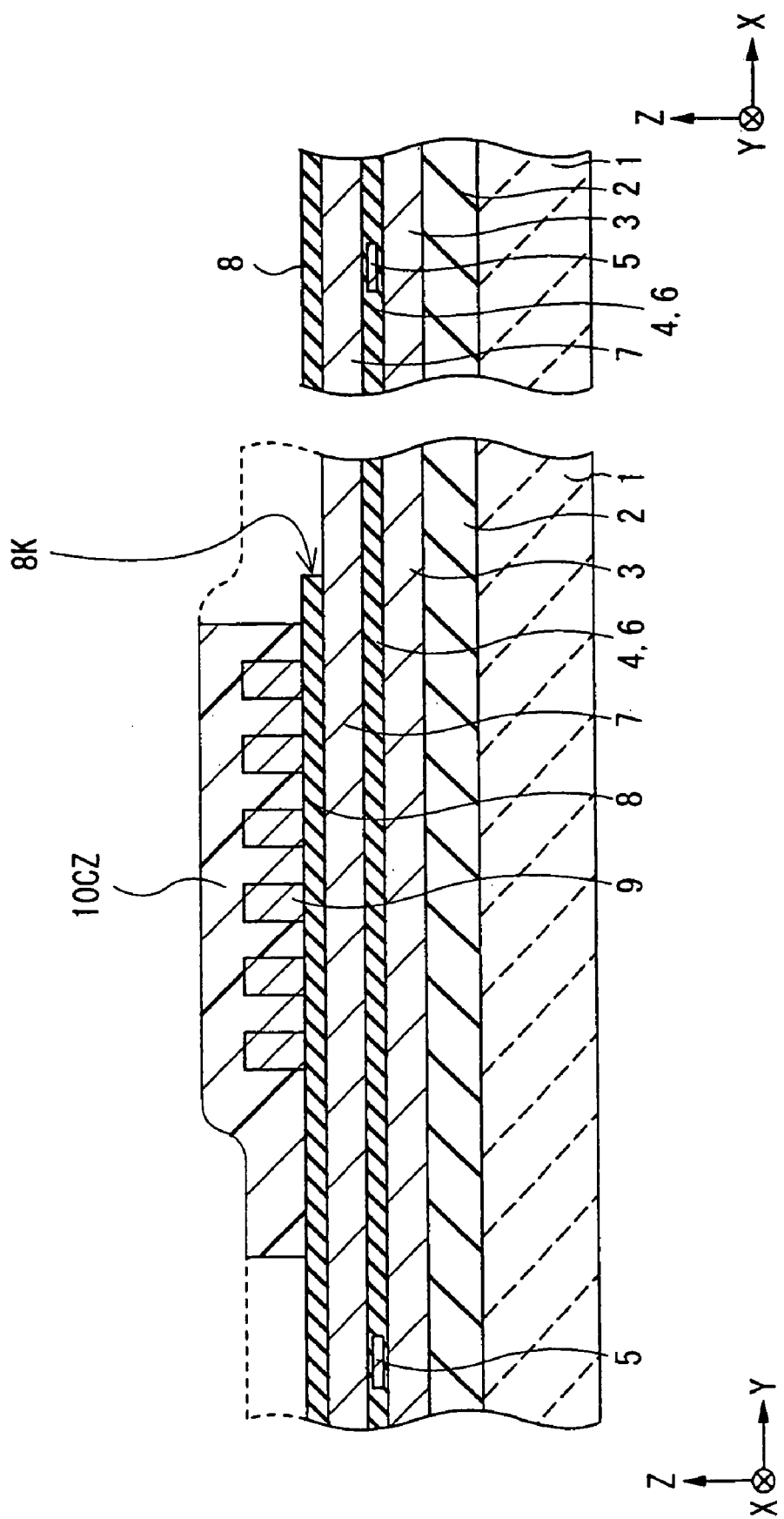

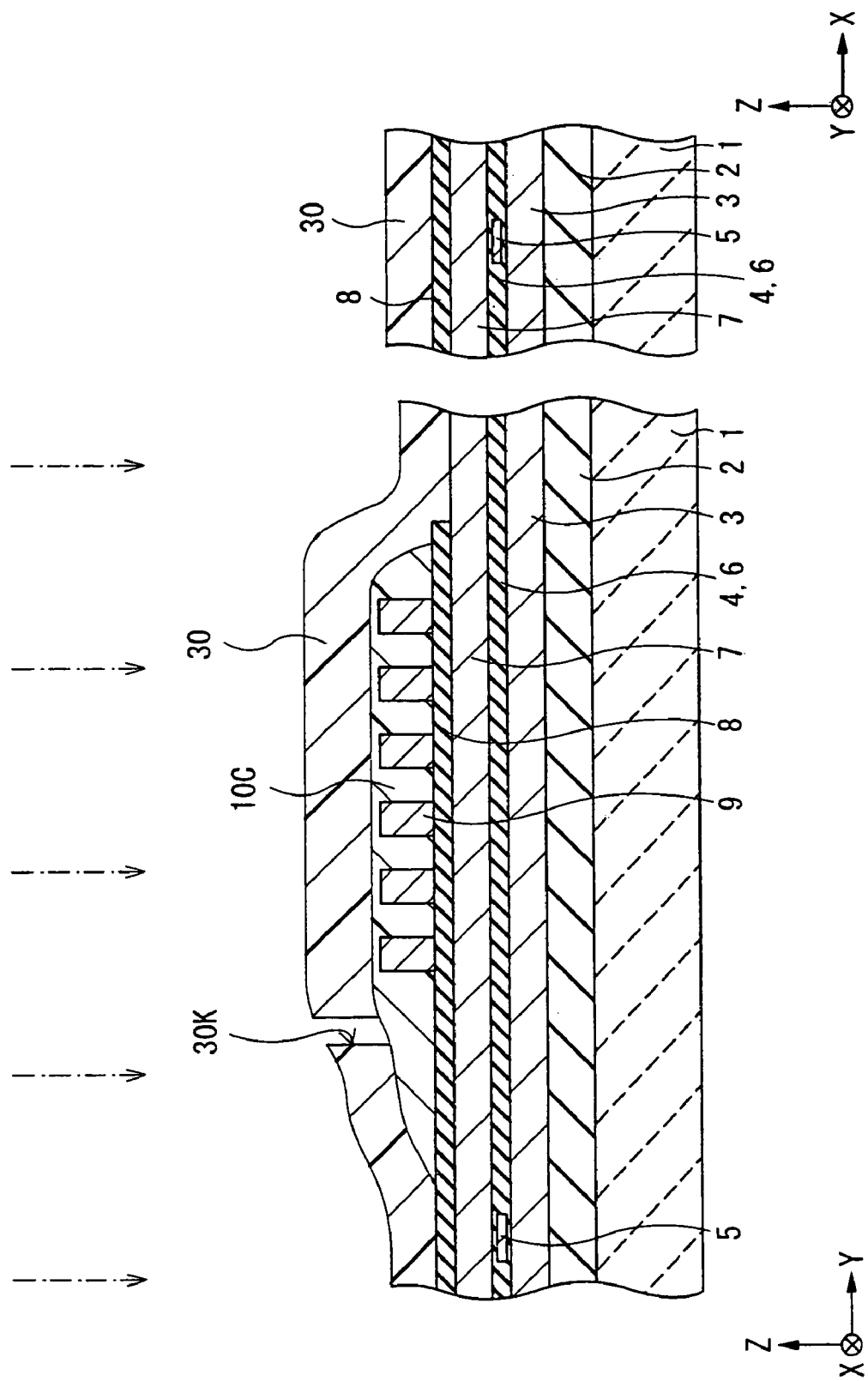

THIN FILM MAGNETIC HEAD AND METHOD OF MANUFACTURING THE SAME

RELATED APPLICATION

This application is a Divisional of patent application Ser. No. 10/028,088, filed on Dec. 21, 2001 now U.S. Pat. No. 6,747,842.

BACKGROUND OF THE INVENTION

1. Field of the Invention

The present invention relates to a thin film magnetic head having an inductive-type magnetic transducer for writing and a method of manufacturing the same.

2. Description of the Related Art

Improvements in the performance of a thin film magnetic head have been sought since an areal density of a hard disk drive has been improved. A composite thin film magnetic head having a structure, in which a recording head having an inductive-type magnetic transducer for writing and a reproducing head having a magnetoresistive (hereinafter referred to as MR) element for reading are stacked, is widely used as the thin film magnetic head.

FIGS. 25A and 25B show an example of a cross sectional structure of a conventional thin film magnetic head. This thin film magnetic head includes, for example, a substrate 101 formed of altic (aluminum oxide and titanium carbide; $Al_2O_3 \cdot TiC$), an insulating layer 102 formed of aluminum oxide ($Al_2O_3$; hereinafter simply referred to as "alumina"), a bottom shield layer 103 formed of ferronickel alloy (NiFe; hereinafter simply referred to as "permalloy" (trade name)), shield gap films 104 and 106 for burying an MR film 105, a top shield layer serving as a bottom pole (hereinafter simply referred to as a "bottom pole") 107, a write gap layer 108 having an opening 108K, a thin film coil 109 formed of copper (Cu) for generating magnetic flux, an insulating layer 110 formed of photoresist for insulating the thin film coil 109 from the adjacent elements, a top pole 111 magnetically coupled to the bottom pole 107 through the opening 108K and forming a propagation path for magnetic flux (magnetic path) with the bottom pole 107, and an overcoat layer 112 serving as a cap film, stacked in this order from the bottom. The shield gap films 104 and 106, the write gap layer 108, and the overcoat layer 112 are formed of, for example, a material similar to that of the insulating layer 102, and the bottom pole 107 and the top pole 111 are formed of, for example, a material similar to that of the bottom shield layer 103.

The top pole 111 and the bottom pole 107 have the same uniform width in the vicinity of the write gap layer 108 located in a region closer to a recording-medium-facing surface (air bearing surface) 120 facing a magnetic recording medium (hereinafter simply referred to as a "recording medium"), and these portions form a pole portion 200 defining a recording track width. This pole portion 200 is formed by, for example, forming the top pole 111 having an uniform width portion (a tip portion 111A) constituting part of the pole portion 200, and then etching the write gap layer 108 and the bottom pole 107 in a self-aligned manner with use of the tip portion 111A as a mask.

Enhancing especially the recording density of the recording head among various performances requires miniaturization of the width of the pole portion 200 (magnetic pole width) to the order of submicrons to increase the track density at the recording medium. For this purpose, the magnetic pole width is preferably made uniform with high precision throughout the pole portion 200. This is because a magnetic pole having a partially greater width causes a side erase, i.e. causing data to be written not only in a track area intended for writing but also in the adjacent track areas, thereby overwriting and erasing information already written in the adjacent track areas.

However, although such miniaturization of the magnetic pole width to the order of submicrons is required, it has been difficult to form the tip portion 111A of the top pole 111 used as a mask for forming the pole portion 200 with high precision because of the reasons below.

When, for example, the thin film coil 109 is first formed on a planar layer lying thereunder (such as the write gap layer 108) and covered with the insulating layer 110, a hill portion (hereinafter referred to also as an "apex portion") of photoresist is formed on the planar underlying layer. The surface of the apex portion in the vicinity of an edge thereof is fluidized by a heat treatment performed on the photoresist to fill in each gap between turns of the thin film coil 109, and therefore this surface is formed as a rounded slope. When the top pole 111 formed of a plated film pattern is provided in a region having an irregular structure resulting from the apex portion and the like, light is reflected horizontally or obliquely from the underlying slope when an exposure process is performed on the photoresist film formed in the irregular structure region during a process of forming a framework (frame pattern) used for forming the plated film pattern. Such reflected light decreases the precision of forming the frame pattern because the reflected light increases or decreases the region in the photoresist film exposed to light. This results in a similar decrease in precision of forming the tip portion 111A of the top pole 111 having a very small width.

Such a decrease in precision of forming the top pole 111 is determined based on, for example, the height of the apex portion from the underlying layer, and the decrease becomes more prominent as an apex angle $\alpha 1$, which is one of the factors determining the performance of the recording head, is increased. The apex angle $\alpha 1$ is an angle between the tangent line to the slope of the insulating layer 10 covering the thin film coil 109 located closer to the air bearing surface 120 side and the surface of the planar underlying layer (write gap layer 108). In the conventional thin film magnetic head shown in FIG. 25A and FIG. 25B, if a sufficient thickness is provided to the part of the insulating layer 110 located over the thin film coil 109 for the sake of electrical isolation between the thin film coil 109 and the top pole 111, the slope of the insulating layer 110 located at the vicinity of its edge becomes steep, resulting in a greater apex angle $\alpha 1$.

FIG. 26A and FIG. 26B show an example of an approach for suppressing the decrease in precision of forming the top pole 111 resulting from an increase in the apex angle $\alpha 1$. FIG. 26A and FIG. 26B are cross sectional views showing a structure of another conventional thin film magnetic head. In this thin film magnetic bead, the insulating layer 110 burying the thin film coil 109 is, for example, composed of two insulating elements (insulating layer portions 110A and 110B). The thin film coil 109 is disposed on the insulating layer portion 110A having a surface formed as a relatively gentle slope in the vicinity of an edge thereof, and the insulating layer portion 110B is disposed so that its edge on the air bearing surface 120 side is recessed to the edge of the insulating layer portion 110A on the air bearing surface 120 side. Although such a configuration can reduce an apex angle $\alpha 2$ as compared to the apex angle in the conventional example shown in FIG. 25A and FIG. 25B ($\alpha 2 < \alpha 1$), a step is created in the thickness direction between the insulating layers 110A and 110B. Such a step in the insulating layer 110 increases the amount of light reflected in the horizontal direction from the slope of the insulating layer portion 110B in the stepped portion located on the air bearing surface 120 side during the exposure process for forming the frame pattern, thereby making it difficult to improve the precision of forming the top pole 111. In addition, the step in the insulating layer 110 causes disturbance in magnetic flux inside the top pole 111 at a portion corresponding to the step, leading to a possible decrease in recording characteristics and the like.

Besides the above-described conventional example, various other specific examples are proposed as an approach of reducing the apex angle to enhance the precision of forming the uniform width portion (tip portion) of the top pole. Japanese Patent Laid-Open Publication No. 2000-251220, for example, discloses an approach in which an insulating layer covering the thin film coil is composed of three insulating layer elements (an apex angle setting insulating layer, an insulating layer for setting a raising angle located on the side of the center of the coil, and a covering insulating layer), and the covering insulating layer having a great thickness and covering the thin film coil partially overlaps the apex angle setting insulating layer having a small thickness (height) disposed isolated from the thin film coil. As in the conventional example shown in FIG. 26A and FIG. 26B, although this approach makes it possible to provide a relatively small apex angle, a step is created by the apex angle setting insulating layer and the covering insulating layer, and therefore it is difficult to achieve the above-described objects, that is, improving the precision of forming the top pole layer and securing stable recording characteristics and the like.

Further, Japanese Patent Laid-Open Publication No.2000-207711 discloses, for example, an approach in which the insulating layer covering the coil layer is composed of three insulating layer elements (first, second, and third insulating layers), and after the first insulating layer, the coil layer, and the second insulating layer are formed in this order, the third insulating layer is provided filing in the stepped region formed by the first and second insulating layers, so that a continuous slope is created by the first, second, and third insulating layers. This approach enables to avoid creation of a step in the insulating layer and therefore suppress decrease in recording characteristics and the like resulting from the step as pointed out in connection with the Japanese Patent Laid-Open Publication No. 2000-251220. However, as the thickness (height) of the entire insulating layer is determined by the sum of the thicknesses of the first and second insulating layers, a relatively great apex angle is provided, making it difficult to improve the precision of forming the top pole.

SUMMARY OF THE INVENTION

The present invention has been conceived in view of the above-described problems, and an object thereof is to provide a thin film magnetic head and a method of manufacturing the same that enable miniaturization of a pole width with high precision.

The present invention provides a method of manufacturing a thin film magnetic head including two magnetic layers magnetically coupled to each other and having two magnetic poles which face each other with a gap layer in between near and in a recording-medium-facing surface to be faced with a recording medium, a thin film coil provided between the two magnetic layers, an insulating-layer for insulating the thin film coil from the two magnetic layers, the method comprises: a first step of forming the thin film coil; a second step of forming a first insulating layer portion having an opening at a region between the thin film coil and the recording-medium-facing surface and serving as part of the insulating layer to cover the thin film coil; a third step of forming a second insulating layer portion covering the entire first insulating layer portion including the opening and serving as part of the insulating layer; and a fourth step of selectively forming one of the two magnetic layers to cover the insulating layer including the first and second insulating layer portions.

In the method of manufacturing a thin film magnetic head of the invention, the thin film coil is first formed in the first step. In the second step, the first insulating layer portion having an opening at a region between the thin film coil and the recording-medium-facing surface and serving as part of the insulating layer is formed to cover the thin film coil. In the third step, the second insulating layer portion covering the entire first insulating layer portion including the opening and serving as part of the insulating layer is formed. In the fourth step, one of the two magnetic layers is selectively formed to cover the insulating layer including the first and second insulating layer portions. A surface of the insulating layer including the first and second insulating layer portions located in the vicinity of an edge thereof on the recording-medium-facing surface side is formed as a continuous slope, to thereby enhance precision of forming one of the magnetic layers to be formed on this slope.

In the method of manufacturing a thin film magnetic head of the invention, preferably the opening is formed at the second step so that the center of the opening is located on the side closer to the thin film coil than the center of a region extending between the thin film coil and an edge of the first insulating layer portion located on the recording-medium-facing surface side.

Further, in the method of manufacturing a thin film magnetic head of the invention, the second step may include the steps of: applying photoresist to cover the thin film coil; forming the opening in the photoresist by photolithography; and performing a heat treatment on the photoresist having the opening to form the first insulating layer portion. Alternatively, the second step may include the steps of: applying photoresist to cover the thin film coil; performing a heat treatment on the applied photoresist; and selectively etching the photoresist subjected to the heat treatment to form the opening, thereby forming the first insulating layer portion.

Further, in the method of manufacturing a thin film magnetic head of the invention, the third step may include the steps of: applying photoresist; and performing a heat treatment on the applied photoresist, thereby completing formation of the second insulating layer portion.

A thin film magnetic head of the invention includes: two magnetic layers magnetically coupled to each other and having two magnetic poles which face each other with a gap layer in between near and in a recording-medium-facing surface to be faced with a recording medium, a thin film coil provided between the two magnetic layers, and an insulating layer for insulating the thin film coil from the two magnetic layers. The insulating layer includes a first insulating layer portion provided to cover the thin film coil and having an opening at a region between the thin film coil and the recording-medium-facing surface, and a second insulating layer portion provided to cover the entire first insulating layer portion including the opening. One of the two magnetic layers is provided to cover the insulating layer including the first and second insulating layer portions.

In the thin film magnetic head of the invention, the insulating layer includes the first insulating layer portion provided to cover the thin film coil and having an opening at a region between the thin film coil and the recording-medium-facing surface, and the second insulating layer portion provided to cover the entire first insulating layer portion including the opening, and one of the two magnetic layers is provided to cover the insulating layer including the first and second insulating layer portions.

Other and further objects, features and advantages of the invention will appear more fully from the following description.

BRIEF DESCRIPTION OF THE DRAWINGS

FIG. 1A and FIG. 1B are cross sectional views for describing a step in a method of manufacturing a thin film magnetic head according to a first embodiment of the invention.

FIG. 4A and FIG. 4B are cross sectional views for describing a step subsequent to the step shown in FIG. 3A and FIG. 3B.

FIG. 10 is a plan view corresponding to the cross sectional views shown in FIG. 2A and FIG. 2B.

FIG. 16A and FIG. 16B are cross sectional views for describing a step in a method of manufacturing a thin film magnetic head according to a second embodiment of the invention.

FIG. 18A and FIG. 18B are cross sectional views for describing a step subsequent to the step shown in FIG. 17A and FIG. 17B.

DETAILED DESCRIPTION OF THE PREFERRED EMBODIMENTS

Preferred embodiments of the invention will now be described in detail with reference to the accompanying drawings.

First Embodiment

Figure 11:
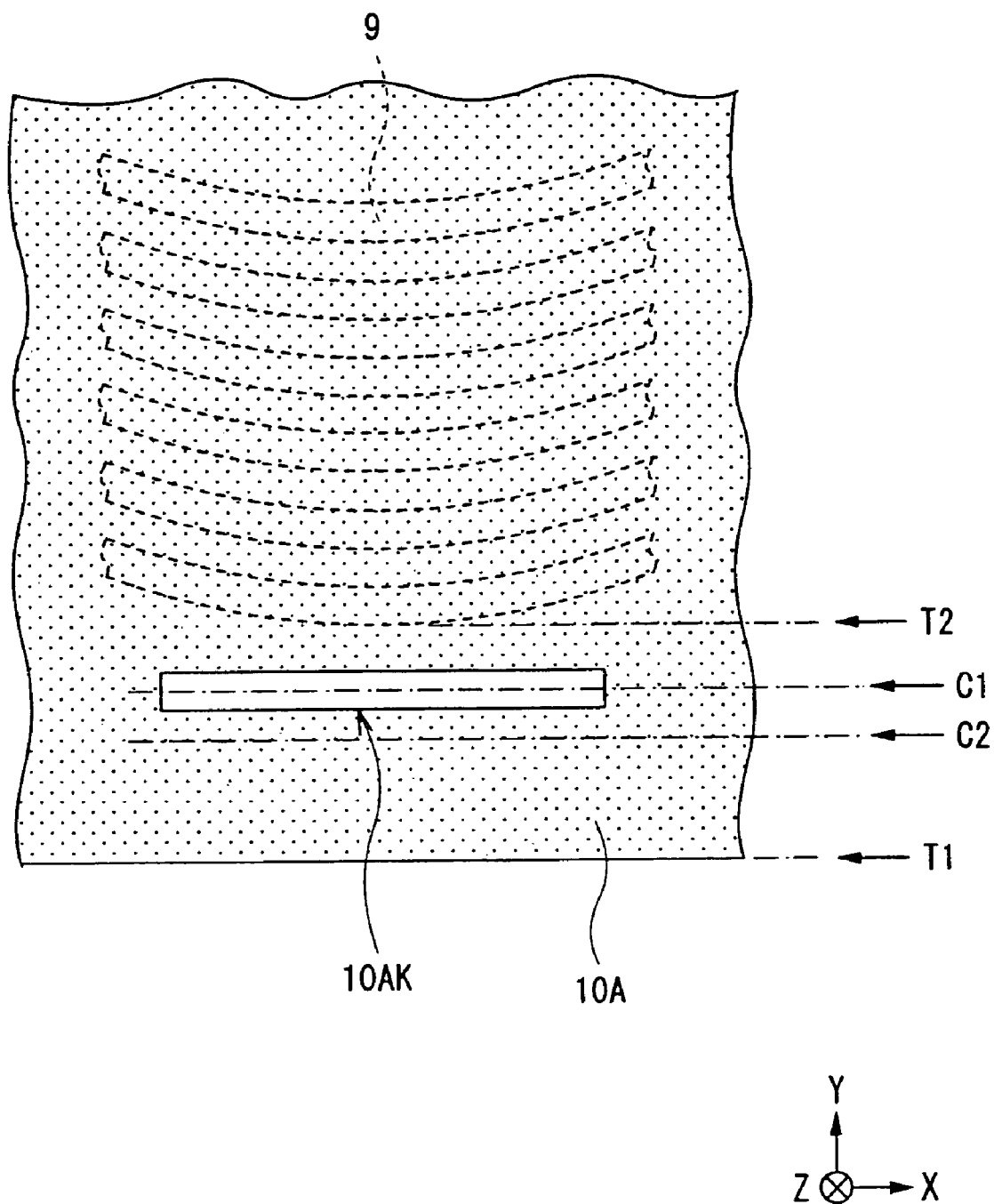
FIG. 11 is a plan view corresponding to the cross sectional views shown in FIG. 3A and FIG. 3B.
Figure 12:
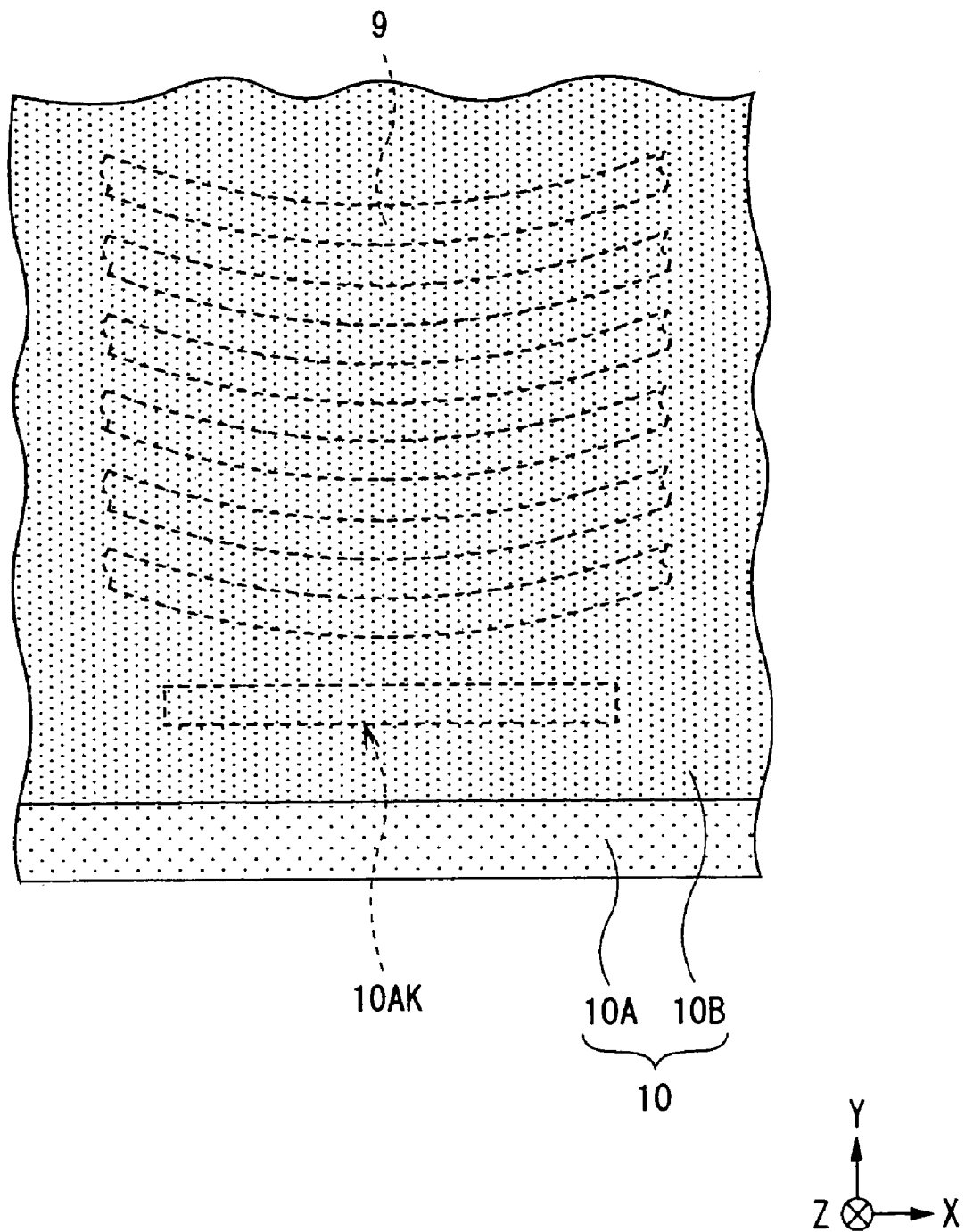
FIG. 12 is a plan view corresponding to the cross sectional views shown in FIG. 5A and FIG. 5B.

A method of manufacturing a composite thin film magnetic head will be described as a method of manufacturing a thin film magnetic head according to a first embodiment of the invention with reference to FIG. 1A to FIG. 12. The thin film magnetic head of this embodiment will be described together with the method of manufacturing a thin film magnetic head of this embodiment because it is embodied by this method. FIG. 1A, FIG. 2A, FIG. 3A, FIG. 4A, FIG. 5A, FIG. 6A, FIG. 7A, FIG. 8A, and FIG. 9A each illustrate a cross section perpendicular to an air bearing surface, while each of FIG. 1B, FIG. 2B, FIG. 3B, FIG. 4B, FIG. 5B, FIG. 6B, FIG. 7B, FIG. 8B, and FIG. 9B illustrates a cross section of a pole portion in parallel to the air bearing surface. FIG. 10, FIG. 11, and FIG. 12 illustrate the planar structures corresponding to the cross sectional structures shown in FIG. 2A and FIG. 2B, FIG. 3A and FIG. 3B, and FIG. 5A and FIG. 5B, respectively. It should be noted, however, that only major components are illustrated in FIG. 10 to FIG. 12 among the components shown in FIG. 2A to FIG. 5B.

In the following description, the dimensions in X-axis, Y-axis, and Z-axis directions in FIG. 1A to FIG. 12 will be referred to as a "width", a "length", and a "thickness (or height)", respectively. Further, the side closer to an air bearing surface 20 in the Y-axis direction (or the side closer to a surface which will serve as the air bearing surface 20) will be referred to as the "front side (or in front)", and the opposite side as the "rear side (or behind)". In description in connection with drawings following FIG. 12 as well, similar expressions will be used regarding the X-axis, Y-axis, and Z-axis directions.

Method of Manufacturing Thin Film Magnetic Head

According to the method of manufacturing a thin film magnetic head of this embodiment, as shown in FIG. 1A and FIG. 1B, an insulating layer 2 formed of, for example, alumina and having a thickness of approximately 3.0 μm to 5.0 μm is first deposited on a substrate 1 formed of, for example, altic. On the insulating layer 2, a bottom shield layer 3 is selectively formed of, for example, permalloy in a thickness of approximately 2.0 μm by, for example, plating described hereinafter. The bottom shield layer 3 is formed to have a planar shape such as the one shown in FIG. 13, which will be described hereinafter.

As shown in FIG. 1A and FIG. 1B, a shield gap film 4 is formed of, for example, alumina having a thickness of approximately 0.01 μm to 0.1 μm on the bottom shield layer 3 by, for example, sputtering. An MR film 5 for constituting an MR element is formed on the shield gap film 4, patterned to a desired shape through high-precision photolithography. Thereafter, a shield gap film 6 is formed of the similar material and by the similar method to the shield gap film 4 to cover the MR film 5, so that the MR film 5 is buried in the shield gap films 4 and 6.

As shown in FIG. 1A and FIG. 1B, a bottom pole 7 is then selectively formed of the similar material and by the similar method to, for example, the bottom shield layer 3 on the shield gap film 6 to have a thickness of approximately 2.0 μm to 3.0 μm. The bottom pole 7 is formed to have a planar shape such as the one shown in FIG. 13, which will be described hereinafter.

As shown in FIG. 1A and FIG. 1B, a write gap layer 8 of, for example, alumina having a thickness of approximately 0.1 μm to 0.3 μm is formed by, for example, sputtering. At this time, an opening 8K is formed in the write gap layer 8, so that the bottom pole 7 is brought into contact with a top pole 11 (see FIG. 6A and FIG. 6B) which will be formed at a later step. It should be noted that the above write gap layer 8 corresponds to one specific example of a "gap layer" of the invention.

As shown in FIG. 1A and FIG. 1B, on the write gap layer 8, a thin film coil 9 for an inductive-type recording head is selectively formed of, for example, copper, in a thickness of approximately 1.5 μm by, for example, electrolytic plating. The thin film coil 9 is formed to have a spiral planar shape such as the one shown in FIG. 13, which will be described hereinafter. It should be noted that FIG. 1A and FIG. 1B illustrate only part of the thin film coil 9.

Figures 2A, 2B:
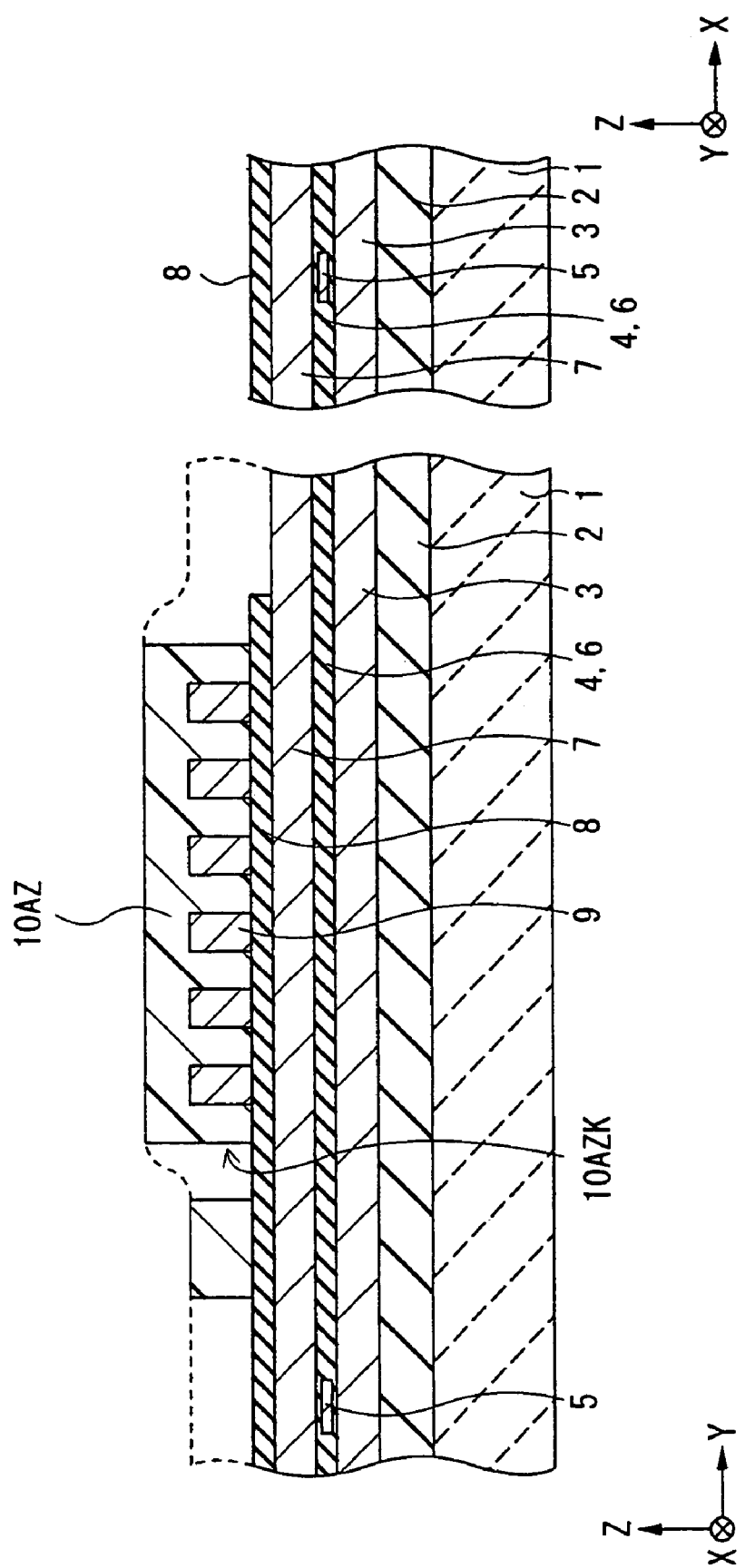
FIG. 2A and FIG. 2B are cross sectional views for describing a step subsequent to the step shown in FIG. 1A and FIG. 1B.

As shown in FIG. 2A and FIG. 2B, a precursor insulating layer 10AZ is formed by applying over the entire surface of the layer structure as mentioned above a material exhibiting fluidability when heated, such as an organic insulating material, including photoresist. This precursor insulating layer 10AZ will function as an insulating layer portion 10A (see FIG. 3A), which will be described hereinafter, after subjected to a patterning process, a heat treatment, and the like at a later step. In the following description, a preparation layer which will serve as an intended insulating layer portion after subjected to a predetermined process at a later step will be referred to as a "precursor insulating layer".

As shown in FIG. 2A, FIG. 2B, and FIG. 10, the precursor insulating layer 10AZ is patterned through high-precision photolithography so that only the portion of the layer 10AZ located in the periphery of the thin film coil 9 remains. In patterning the precursor insulating layer 10AZ, an opening 10AZK having, for example, a rectangular planar shape is selectively formed at a region of the precursor insulating layer 10AZ located forward of the thin film coil 9. The location where the opening 10AZK is to be formed will be described hereinafter.

Figures 3A, 3B:
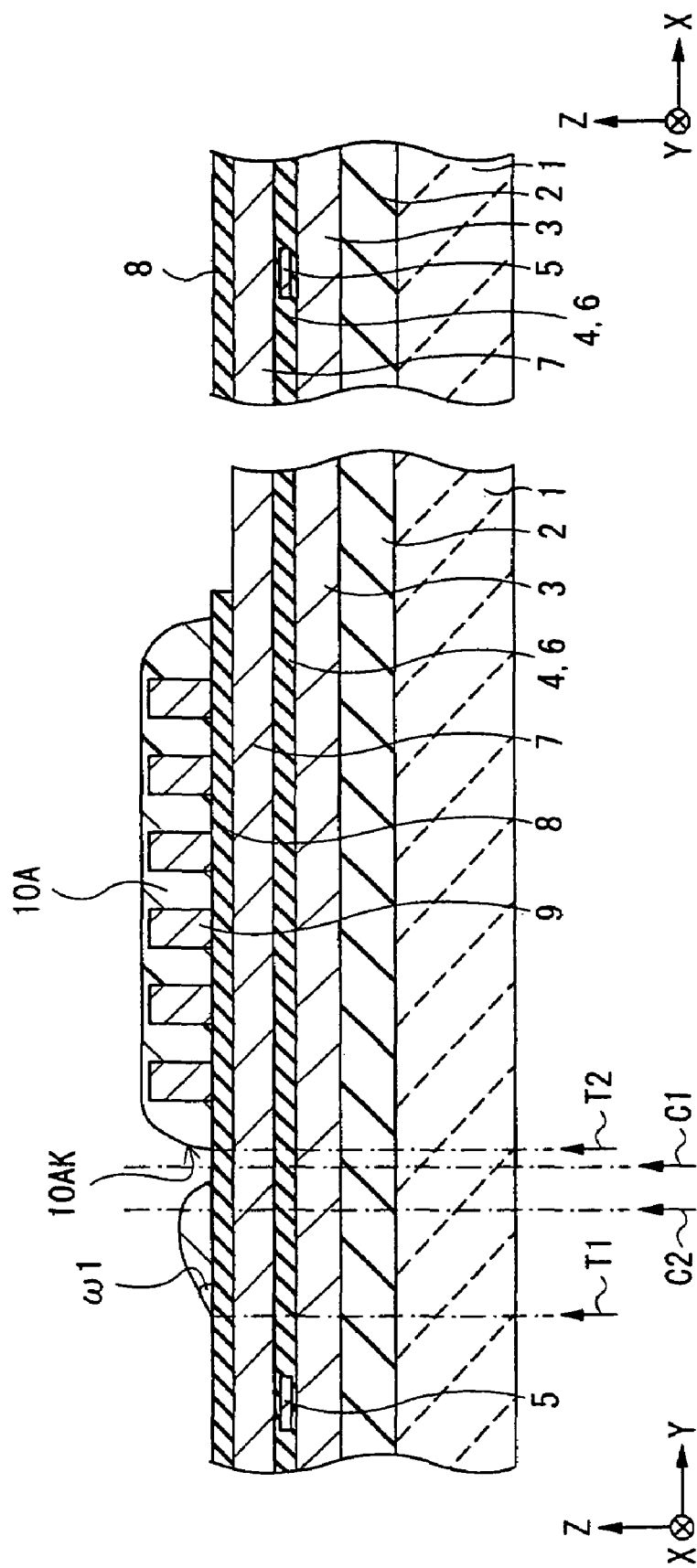
FIG. 3A and FIG. 3B are cross sectional views for describing a step subsequent to the step shown in FIG. 2A and FIG. 2B.

The precursor insulating layer 10AZ formed of photoresist is subjected to a heat treatment at a temperature in the range of approximately 200° C. to 250° C. Through this heat treatment, each gap between turns of the thin film coil 9 is completely filled in, as shown in FIG. 3A, FIG. 3B, and FIG. 11, by the fluidizing photoresist, so that the insulating layer portion 10A having an opening 10AK corresponding to the opening 10AZK is selectively formed. This insulating layer portion 10A forms part of the below-described insulating layer 10 (see FIG. 5A) for insulating the thin film coil 9 from the other elements located in the peripheral region thereof. The surface of the insulating layer portion 10A located in the vicinity of the edge thereof is formed as a rounded slope because the photoresist fluidizes, and similarly the surface of the opening 10AK located in the vicinity of the edge thereof is formed as a rounded slope. In forming the insulating layer portion 10A, preferably the portion of the insulating layer portion 10A located over the thin film coil 9, for example, has a thickness reduced to the extent that exposure of the thin film coil 9 can be avoided to obtain a smallest possible angle ω1 formed between the planar underlying layer (the write gap layer 8) and the front slope, so as to achieve a smaller apex angle θ1 (see FIG. 9A) described hereinafter. It is also preferable that, for example, the opening 10AK is formed so that the center C1 of the opening 10AK is located behind the center C2 of the region extending between a position T1 of a front end of the insulating layer portion 10A and a position T2 of a front end of the thin film coil 9. At the previous step of forming the precursor insulating layer 10AZ (and the opening 10AZK), the position where the opening 10AZK is formed is adjusted so that the opening 10AK in the insulating layer portion 10A is formed at the position satisfying the above conditions. It should be noted that the insulating layer portion 10A mainly corresponds to one specific example of a "first insulating layer portion" in claim 3 of the invention.

Next, as shown in FIG. 4A and FIG. 4B, a precursor insulating layer 10BZ is formed by applying, for example, photoresist over the entire surface of the layer structure as mentioned above. The precursor insulating layer 10BZ is patterned through high-precision photolithography so as to leave only the region of the layer 10BZ located in the periphery of the thin film coil 9. Such a patterning of the precursor insulating layer 10BZ is performed so that at least the opening 10AK is covered with the precursor insulating layer 10BZ and that, for example, the front end of the precursor insulating layer 10BZ is located behind the front end of the insulating layer portion 10A.

Figures 5A, 5B:
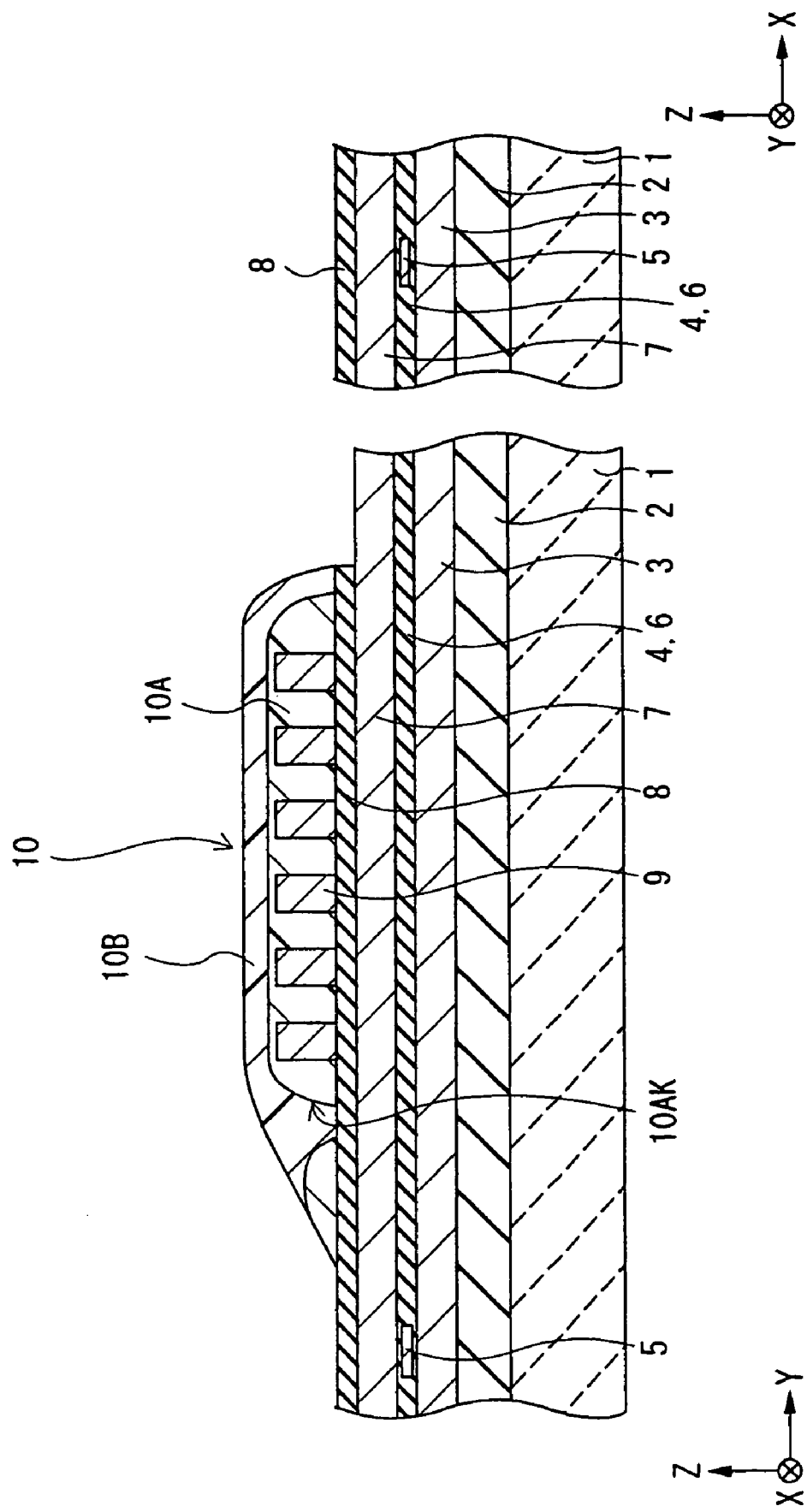
FIG. 5A and FIG. 5B are cross sectional views for describing a step subsequent to the step shown in FIG. 4A and FIG. 4B.

Similarly to the formation of the insulating layer portion 10A, the precursor insulating layer 10BZ formed of photoresist is subjected to a heat treatment at a temperature in the range of approximately 200° C. to 250° C. Through this heat treatment, the opening 10AK is completely filled in, as shown in FIG. 5A, FIG. 5B, and FIG. 12, by the fluidizing photoresist, so that an insulating layer portion 10B is formed to have a sloped surface in the vicinity of the front edge thereof. This insulating layer portion 10B forms part of the insulating layer 10 together with the insulating layer portion 10A. The insulating layer portion 10B is formed so that the surface of the insulating layer portion 10B located in the vicinity of the front edge thereof forms a slope continued from the slope of the insulating layer portion 10A on the front side by adjusting conditions during the heat treatment and the like. The insulating layer portion 10B has such a thickness over the thin film coil 9 that, together with the part of the insulating layer portion 10A located on the thin film coil 9, the thin film coil 9 and the top pole 11 (see FIG. 6A and FIG. 6B) formed at a later step can be electrically isolated from each other. As a result, the insulating layer 10 composed of the insulating layer portions 10A and 10B is formed. It should be noted that the insulating layer portion 10B corresponds to one specific example of a "second insulating layer portion" of the invention, and the insulating layer 10 composed of the insulating layer portions 10A and 10B corresponds to one specific example of an "insulating layer" of the invention.

Figures 6A, 6B:
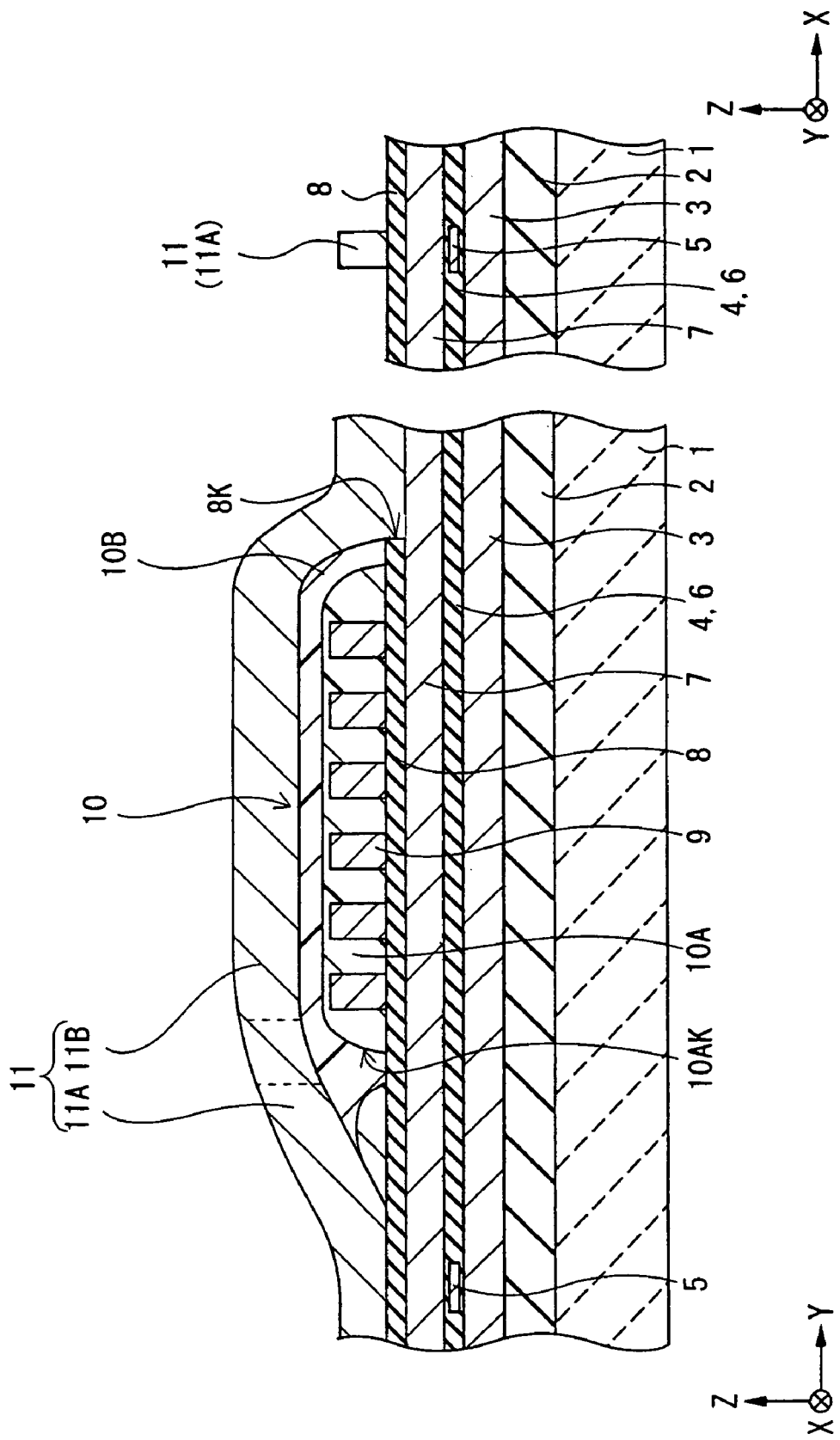
FIG. 6A and FIG. 6B are cross sectional views for describing a step subsequent to the step shown in FIG. 5A and FIG. 5B.
Figure 13:
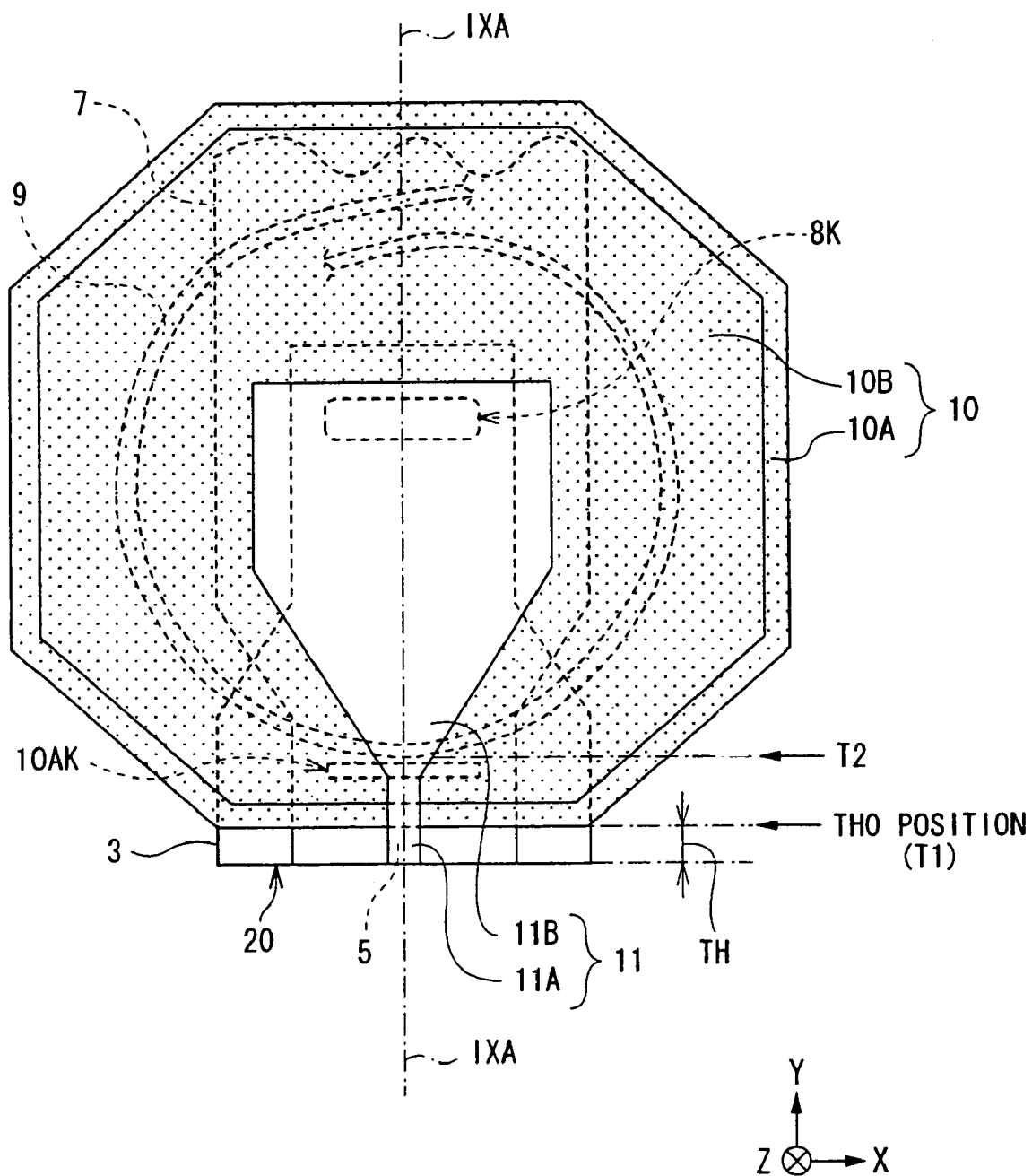
FIG. 13 is a plan view illustrating a planar structure of the thin film magnetic head according to the first embodiment of the invention.

Next, as shown in FIG. 6A and FIG. 6B, the top pole 11 of, for example, permalloy is selectively formed in a thickness of approximately 2.0 µm to 3.0 µm by, for example, plating over a region extending from the write gap layer 8 located on the side where the air bearing surface 20 will be formed (on the left side of the figure) to the opening 8K where the bottom pole 7 is exposed, to thereby cover the insulating layer 10 (insulating layer portions 10A and 10B). As shown in FIG. 13, which will be described hereinafter, the top pole 11 is formed so that, for example, it includes a tip portion 11A and a yoke portion 11B located in this order from the side where the air bearing surface 20 will be formed at a later step, and that the tip portion 11A has a very small uniform width (such as approximately 0.3 µm) defining the recording track width. The characteristics of the top pole 11 in terms of its shape will be described hereinafter. The top pole 11 is magnetically coupled to the bottom pole 7 in the opening 8K, and therefore the bottom pole 7 and the top pole 11 form a propagation path for magnetic flux, i.e. a magnetic path. It should be noted that the top pole 11 corresponds to one specific example of "one of the two magnetic layers" of the invention.

In forming the top pole 11 by plating, an electrode film serving as a seed layer in electrolytic plating is formed through, for example, sputtering on a surface of the layer (such as the insulating layer 10) underlying the top pole 11 to be formed at a later step. The electrode film is formed of, for example, the material similar to that of the top pole 11 (such as permalloy). Next, photoresist is applied over the above-described electrode film to form a photoresist film, which is then patterned through high-precision photolithography, thereby selectively forming a framework (frame pattern) for forming the top pole 11. Using the frame pattern as a mask and the electrode film formed at the previous step as the seed layer, permalloy is deposited by electrolytic plating, to thereby selectively form the top pole 11. Finally, after thus forming the top pole 11, the frame pattern is removed.

Figures 7A, 7B:
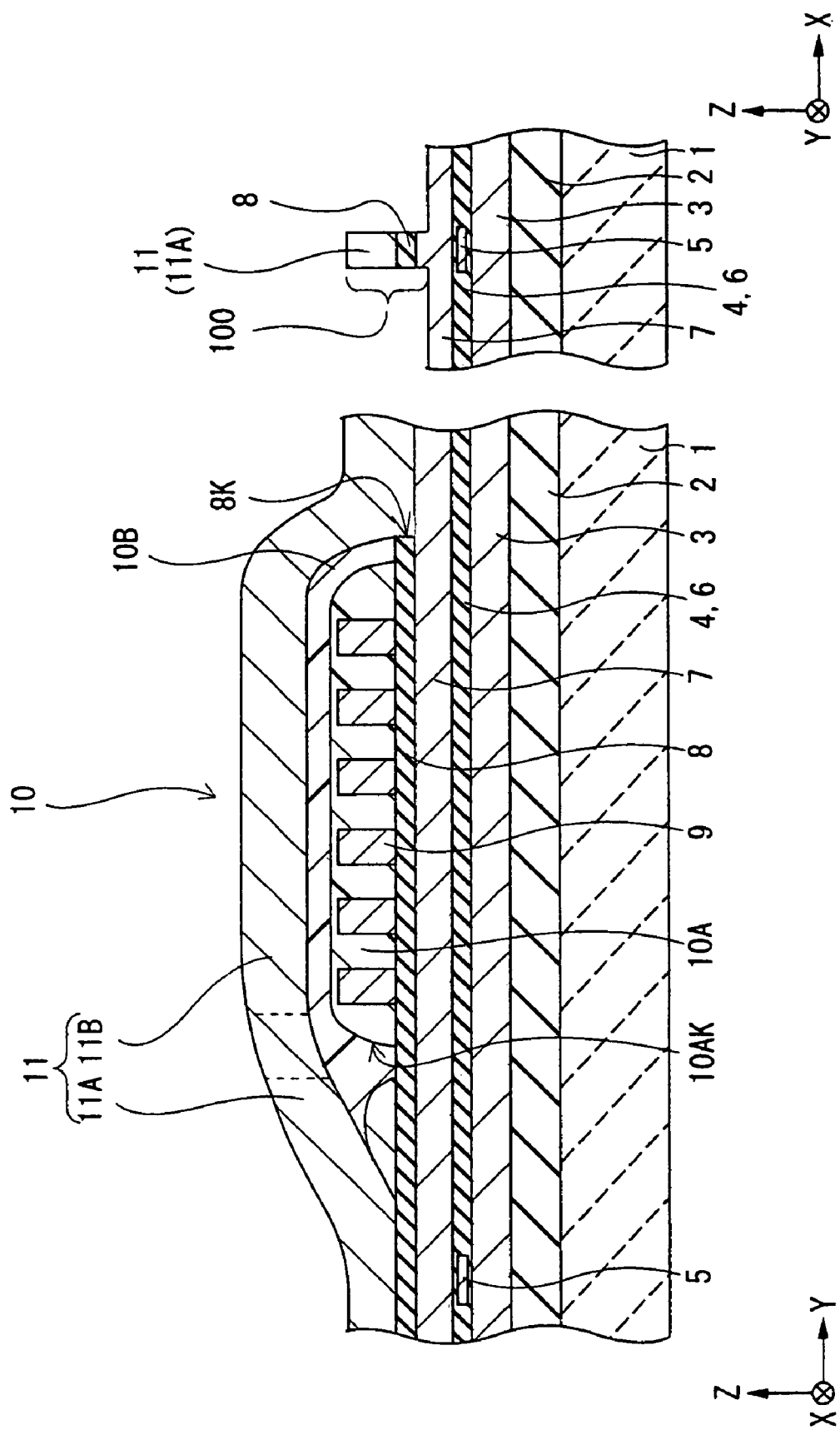
FIG. 7A and FIG. 7B are cross sectional views for describing a step subsequent to the step shown in FIG. 6A and FIG. 6B.

Using the tip portion 11A of the top pole 1 as a mask, the portions of the write gap layer 8 and the bottom pole 7 in the periphery of the tip portion 11A are etched in a self-aligned manner by approximately 0.5 µm through, for example, ion milling or reactive ion etching (RIE). As a result, a pole portion 100 having a trim structure is formed as shown in FIG. 7B. The pole portion 100 is composed of the tip portion 11A of the top pole 11, the portion of the bottom pole 7 corresponding to the tip portion 11A, and the part of the write gap layer 8 sandwiched by these portions, and the respective portions have substantially the same width.

Figures 8A, 8B:
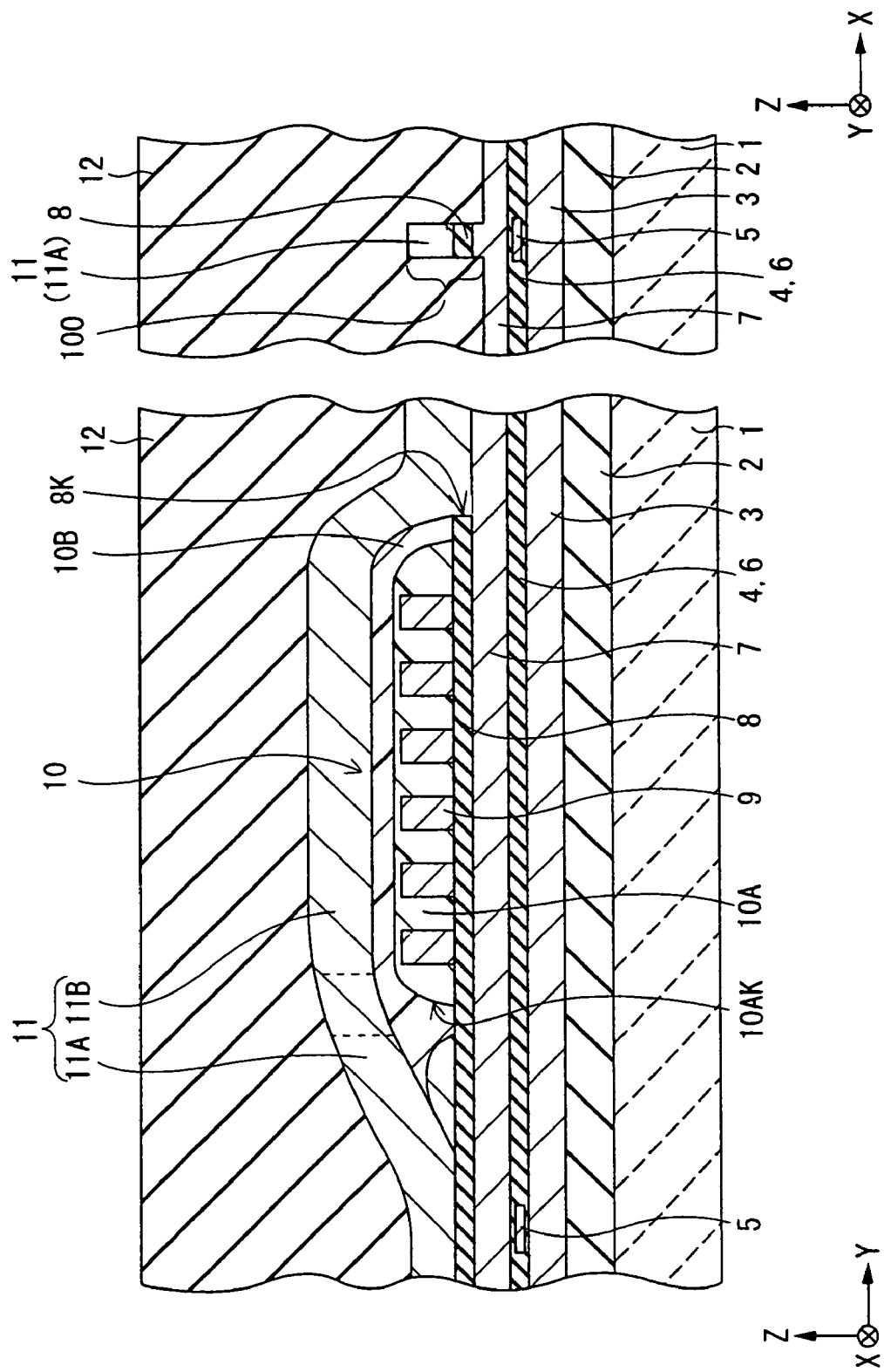
FIG. 8A and FIG. 8B are cross sectional views for describing a step subsequent to the step shown in FIG. 7A and FIG. 7B.

As shown in FIG. 8A and FIG. 8B, the overcoat layer 12 is formed of an insulating material, including inorganic insulating material, such as alumina, in a thickness of approximately 20 µm to 40 µm over the entire surface of the layer structure as mentioned above.

Figures 9A, 9B:
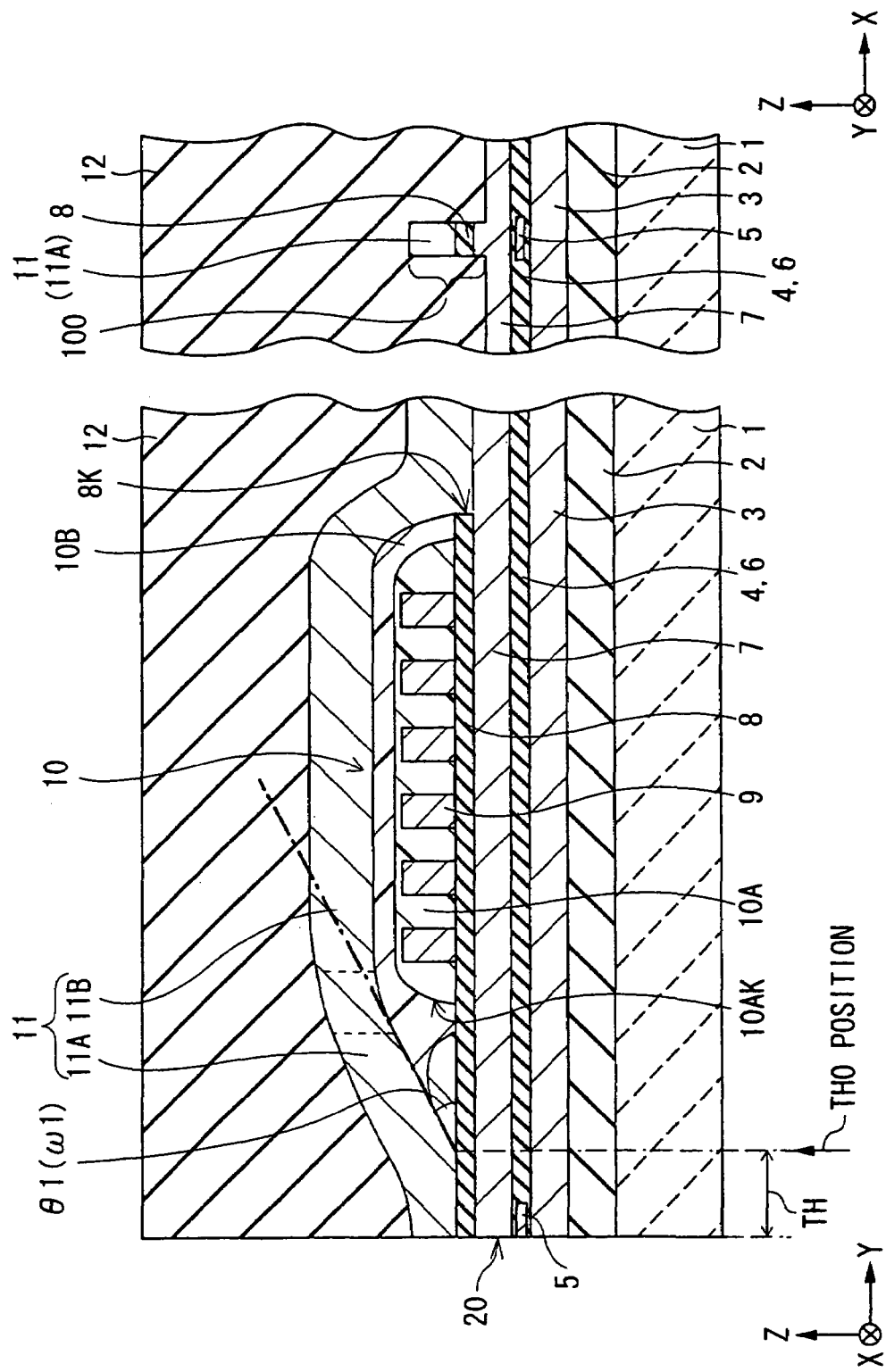
FIG. 9A and FIG. 9B are cross sectional views for describing a step subsequent to the step shown in FIG. 8A and FIG. 8B.

Finally, the air bearing surface 20 of the recording head and the reproducing head is formed by machining and polishing as shown in FIG. 9A, thereby completing a thin film magnetic head.

Structure of Thin Film Magnetic Head

A planar structure of the thin film magnetic head according to this embodiment will next be described with reference to FIG. 13.

FIG. 13 is a plan view schematically illustrating a planar structure of the thin film magnetic head manufactured in accordance with the method of manufacturing a thin film magnetic head according to this embodiment. In FIG. 13, the substrate 1, the insulating layer 2, the overcoat layer 12 and the like are not shown, and the thin film coil 9 is indicated only by part of the outermost peripheral portion thereof. FIG. 9A shows the cross section taken along the line IXA—IXA in FIG. 13.

The position T1 of the front end of the insulating layer portion 10A is the reference position defining the throat height (TH), which is one of the factors determining the performance of the recording head, i.e. the throat height zero position (TH0 position). The throat height (TH) is defined as the distance between the position T1 of the front end of the insulating layer portion 10A (TH0 position) and the air bearing surface 20.

As described above, the insulating layer 10 is composed of the insulating layer portion 10A having the opening 10AK, and the insulating layer portion 10B covering the opening 10AK and its peripheral region and is disposed to cover the thin film coil 9.

The top pole 11 includes, for example, the tip portion 11A having a very small uniform width defining the recording track width, and the yoke portion 11B having a width greater than that of the tip portion 11A and accommodating magnetic flux generated by the thin film coil 9, provided in this order from the air bearing surface 20 side, as described above. The tip portion 11A has, for example, a rectangular planar shape. The width of the yoke portion 11B is, for example, substantially uniform in a rear region thereof, and is gradually reduced in a front region thereof as it approaches the air bearing surface 20.

Operation of Thin Film Magnetic Head

Next, operation of the thin film magnetic head of the present embodiment will be described with reference to FIG. 9A, FIG. 9B, and FIG. 13.

In this thin film magnetic head, when current flows through the thin film coil 9 via an unillustrated external circuit during information recording operation, magnetic flux is generated in response thereto. The thus generated magnetic flux is first accommodated in the yoke portion 11B of the top pole 11, and is then propagated from the yoke portion 11B to the tip portion 11A. The magnetic flux propagated to the tip portion 11A is further propagated to reach the very tip of the tip portion 11A located on the air bearing surface 20 side. The magnetic flux reached the very tip of the tip portion 11A generates a signal magnetic field for recording in an external region located in the vicinity of the write gap layer 8. Such a signal magnetic field partially magnetizes the magnetic recording medium, so that information can be recorded therein.

On the other hand, a sense current flows through the MR film 5, during information reproducing operation. As the resistance of the MR film 5 is changed with a reproduction signal magnetic field applied from the magnetic recording medium, information recorded in the magnetic recording medium can be read out by detecting a change in resistance using a change in sense current.

Functions and Effects of This Embodiment

Figures 14A, 14B:
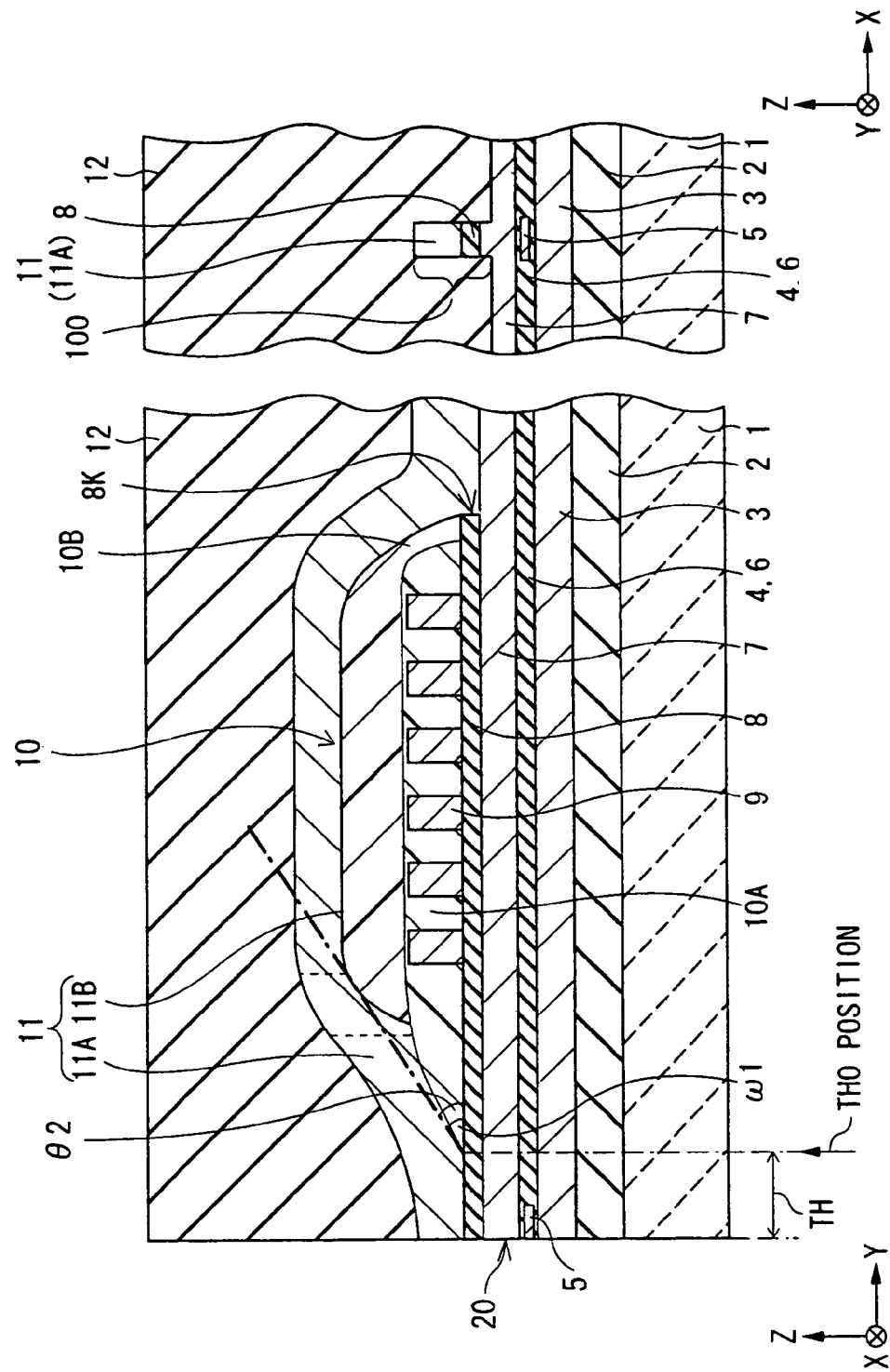
FIG. 14A and FIG. 14B are cross sectional views for describing an example of a cross sectional structure of a thin film magnetic head in comparison with the thin film magnetic head according to the first embodiment of the invention.

With reference to FIG. 9A, FIG. 9B, FIG. 14A, and FIG. 14B, functions and effects of this embodiment will be described. FIG. 14A and FIG. 14B illustrate cross sectional structures of a thin film magnetic head provided as an example compared with that of the thin film magnetic head of the present embodiment, showing the portion corresponding to FIG. 9A and FIG. 9B. As the insulating layer 10 is formed by first forming the insulating layer portion 10A having the opening 10AK and then forming the insulating layer portion 10B to cover at least the opening 10AK in this embodiment, the apex angle $\theta 1$ can be reduced and the pole portion 100 can be formed with high precision to have a very small uniform width, because of the following reasons.

In forming the top pole 11 by plating on the layer including a hill portion (apex portion) formed by the insulating layer 10, the precision of forming the top pole 11 depends on the apex angle $\theta 1$, which is one of the factors determining the performance of the recording head and an indicator of the height of the apex portion. This is because, when a light exposure process is performed on the photoresist film formed on the layer including the apex portion at a step of forming a frame pattern used for forming the top pole 11, light is reflected in the oblique or horizontal direction mainly from the surface of the electrode film formed on the front slope of the apex portion, and such reflected light increases or decreases an exposure region in the photoresist film, thereby lowering the precision of forming the frame pattern. In order to form the pole portion 100 having a very small uniform width, the apex angle 01 must be minimized to suppress the above-described adverse effects of reflected light, so that the portion of the frame pattern corresponding to the tip portion 11A is formed with high precision, and therefore the tip portion 11A of the top pole 11 is also formed with high precision.

In the comparison example (see FIG. 14A and FIG. 14B), however, the opening 10AK (see FIG. 9A) is not formed in the insulating layer portion 10A. In such a structure, even when the insulating layer portion 10A is formed having the properly reduced thickness at the portion located on the thin film coil 9 and a smaller angle $\omega 1$ between the planar underlying layer (write gap layer 8) and its front slope, a bulky insulating layer portion 10B is formed on the insulating layer portion 10A. As a result, an apex angle $\theta 2$ becomes greater than the angle $\omega 1$ ($\theta 2 > \omega 1$), and therefore the precision of forming the top pole 11 (tip portion 11A) is lowered.

In addition, in the comparison example, a step is created in the height direction between the insulating layer portions 10A and 10B because the insulating layer portion 10B provided on the portion 10A is bulky. Such a step in the apex portion causes an increase in amount of light reflected in the horizontal direction from the step, especially from the sloped surface located in the vicinity of the front edge of the insulating layer portion 10B, during formation of the frame pattern. This increase also causes a decrease in precision of forming the top pole (tip portion 11A).

On the other hand, according to the present embodiment (see FIG. 9A and FIG. 9B), the opening 10AK is formed in the insulating layer portion 10A, so that part of the insulating layer portion 10B is buried in the opening 10AK when the insulating layer portion 10B is formed on the insulating layer portion 10A. In such a configuration, the surface of the part of the insulating layer portion 10B corresponding to the opening 10AK is positioned lower than that in the comparison example, and therefore the apex angle $\theta 1$ is substantially equal to the angle $\omega 1$ ($\theta 1 \approx \omega 1$), unlike the comparison example where the apex angle $\theta 2$ is greater than the angle $\omega 1$. Further, by utilizing the photoresist fluidized into the opening 10AK during formation of the insulating layer portion 10B, the insulating layer portion 10B can be easily provided with a slope at the front edge continued from the slope of the insulating layer portion 10A located at the front portion, in contrast to the comparison example where a step is created in the apex portion. These characteristics make it possible to avoid creation of the step in the apex portion and to reduce the apex angle $\theta 1$ according to the present embodiment, unlike the above-described comparison example, or the conventional example or disclosure example described in connection with the related art section.

Further, according to this embodiment, as the insulating layer 10 (insulating layer portions 10A and 10B) has a surface formed as a continued slope in the vicinity of the front edge thereof, magnetic flux can be smoothly propagated in the top pole 11, to thereby ensure stable recording characteristics and the like. This is because, while a step is created between the insulating layer portions 10A and 10B to possibly cause disturbance of magnetic flux in the portion of the top pole 11 corresponding to the step in the comparison example, no step is created in the present embodiment, and therefore disturbance of magnetic flux caused by creation of the step is avoided in the present embodiment. As a result, the magnetic flux can be smoothly propagated.

Further, according to this embodiment, the center C1 of the opening 10AK is positioned behind the center C2 of the region extending between the position T1 of the front end of the insulating layer portion 10A and the position T2 of the front end of the thin film coil 9 as shown in FIG. 3A, FIG. 3B, and FIG. 11, whereby the apex angle $\theta 1$ can be reduced as compared to the configuration where the center C1 of the opening 10AK is positioned in front of the center C2 of the region extending between the positions T1 and T2.

Variation of this Embodiment

While in the present embodiment the opening 10AK has a rectangular shape, the present invention is not limited thereto, and the opening 10AK may have a different shape from a rectangle (such as an ellipsoidal shape). Further, the number of openings 10AK is not limited to one, and a plurality of openings 10AK may be provided. In such a configuration as well, the effects same as that of the above-described embodiment can be enjoyed.

Figure 15:
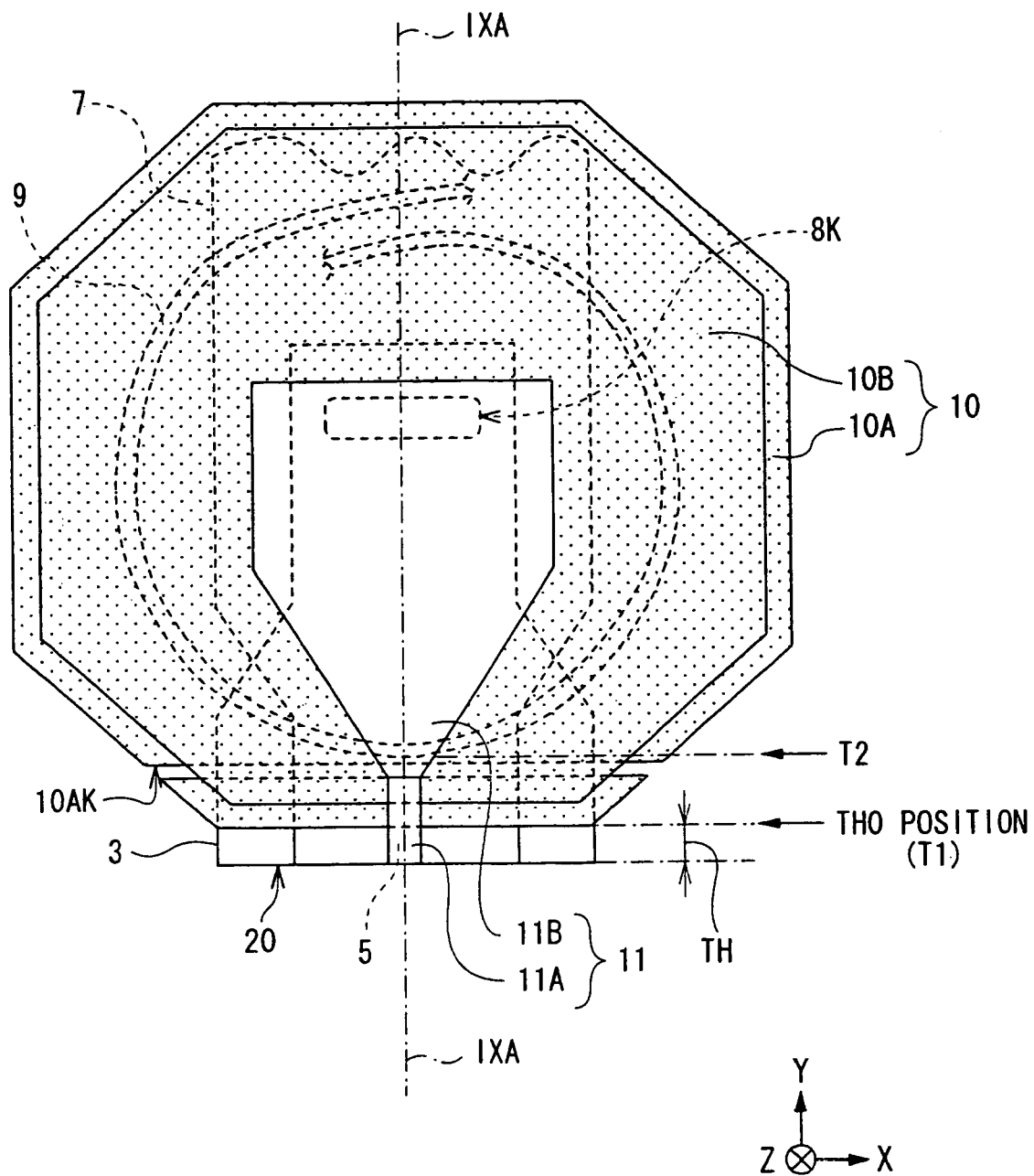
FIG. 15 is a plan view illustrating a planar structure of a thin film magnetic head as a variation of the structure of the thin film magnetic head according to the first embodiment of the invention.

The size of the opening 10AK according to this embodiment may be varied as desired. FIG. 15 shows a planar structure of a thin film magnetic head as a variation of the thin film magnetic head of this embodiment, and illustrates the portion corresponding to that shown in FIG. 13. FIG. 15 shows a configuration where, for example, the opening 10AK is extended in the width direction and the insulating layer portion 10A is divided into two portions (front and rear portions) by the opening 10AK. The size of the opening 10AK in the length direction may, of course, be varied as desired in accordance with the precision of forming the top pole 11 and the like.

Second Embodiment

A second embodiment of the invention will next be described.

In a method of manufacturing a thin film magnetic head according to the second embodiment of the invention, the insulating layer portion 10A (opening 10AK) is formed by etching, rather than by photolithography as in the first embodiment.

Figures 21A, 21B:
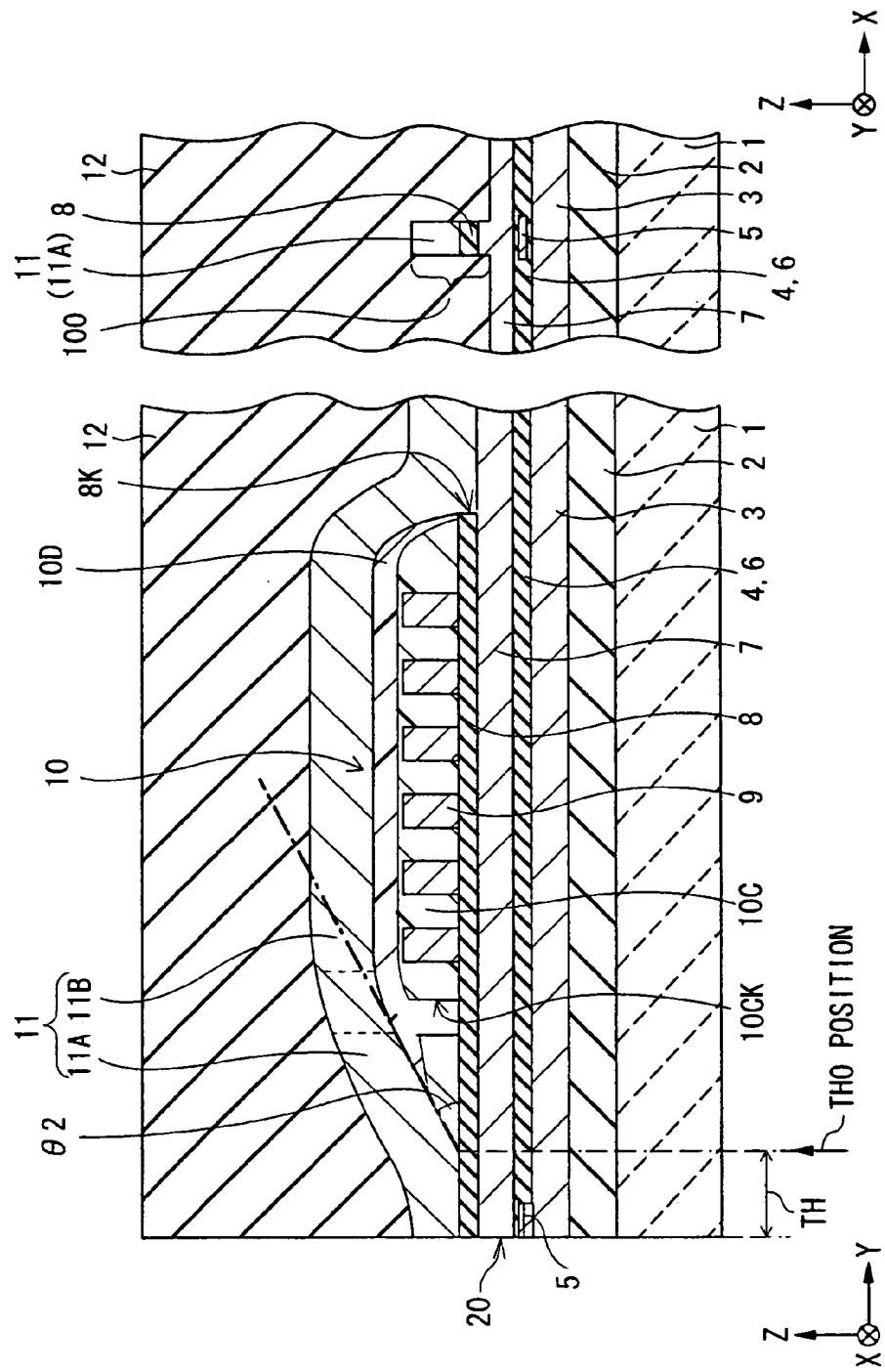
FIG. 21A and FIG. 21B are cross sectional views illustrating a cross sectional structure of the thin film magnetic head manufactured by the method of manufacturing a thin film magnetic head according to the second embodiment of the invention.
Figure 22:
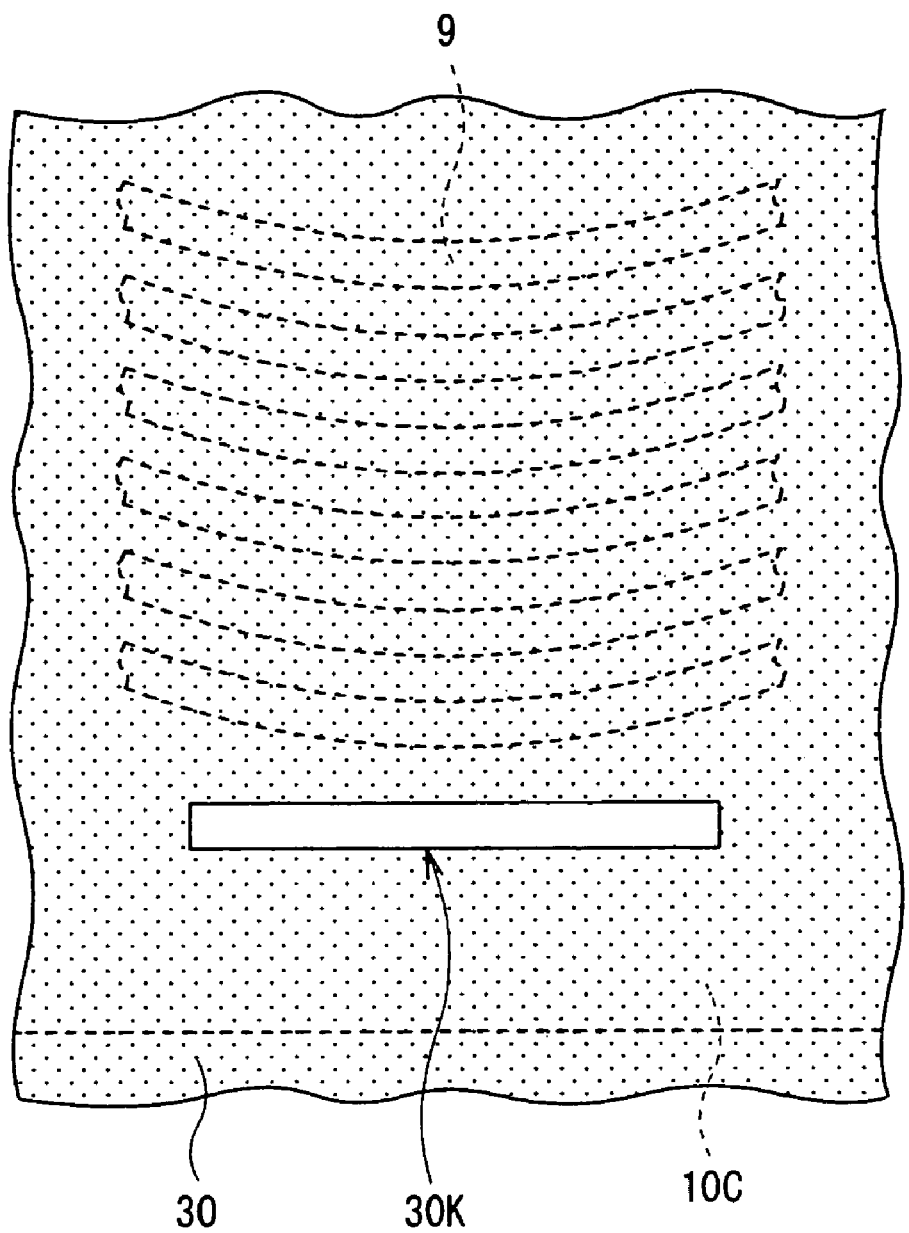
FIG. 22 is a plan view corresponding to the cross sectional views shown in FIG. 18A and FIG. 18B.
Figure 23:
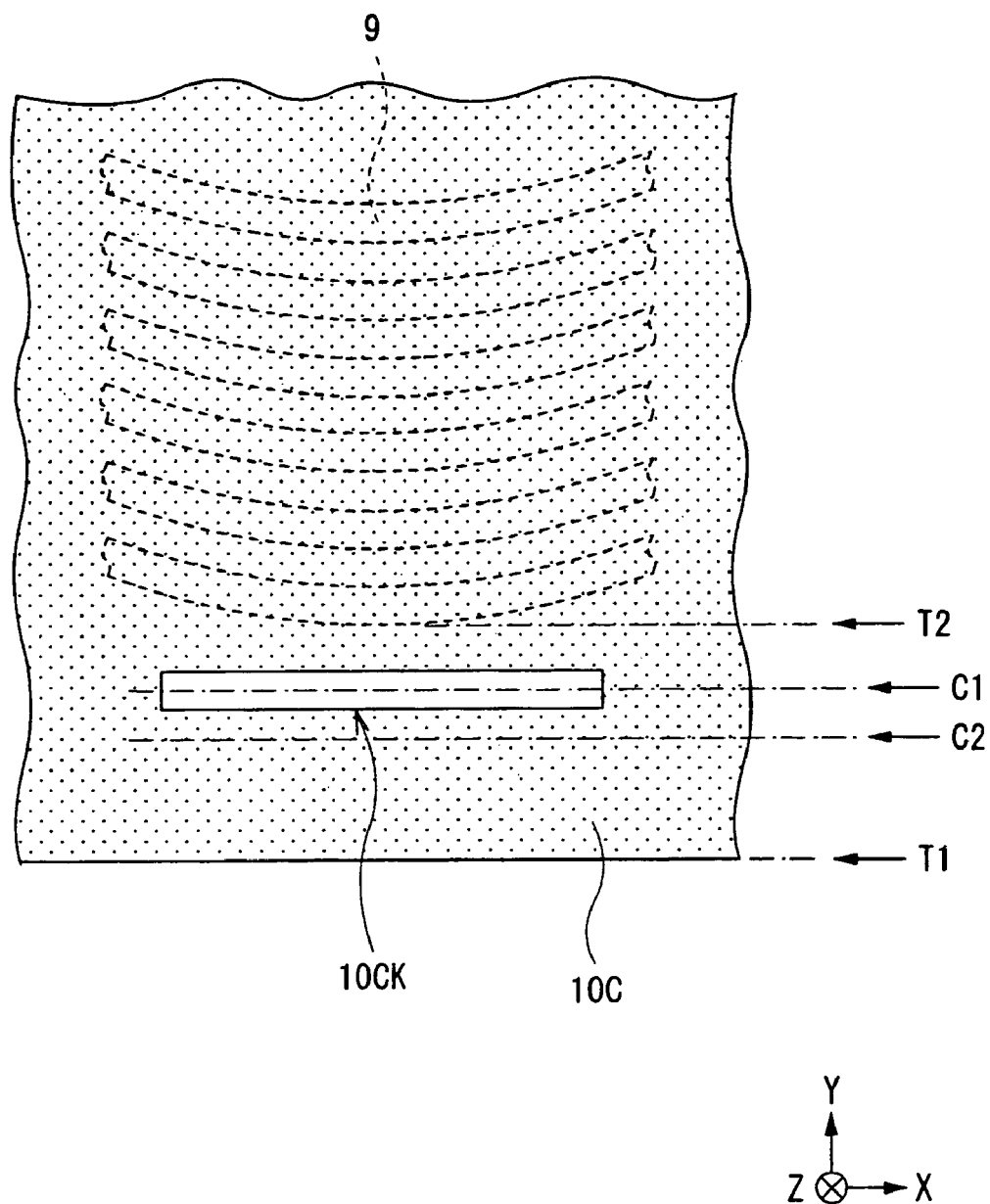
FIG. 23 is a plan view corresponding to the cross sectional views shown in FIG. 19A and FIG. 19B.
Figure 24:
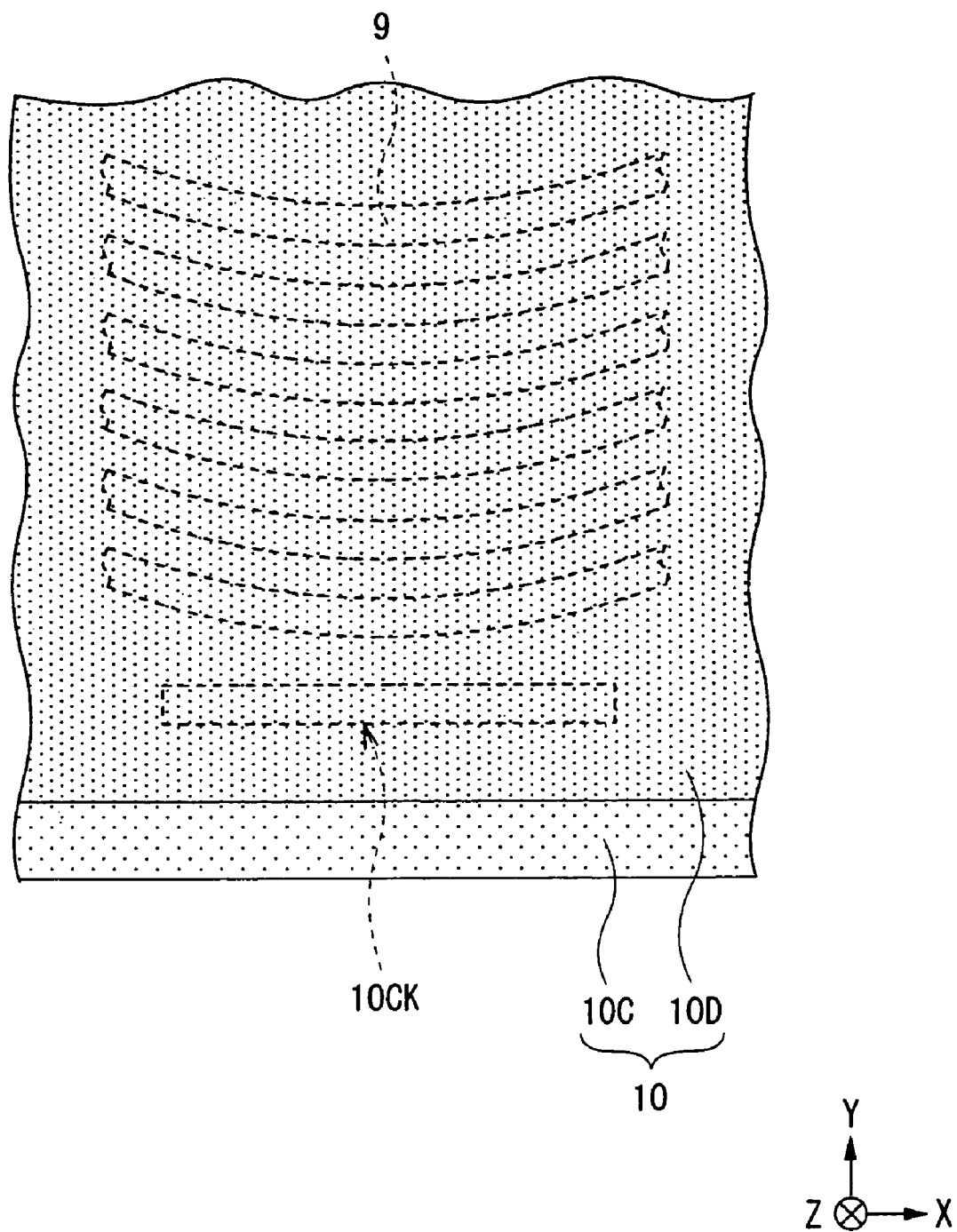
FIG. 24 is a plan view corresponding to the cross sectional views shown in FIG. 20A and FIG. 20B.
Figures 25A, 25B:
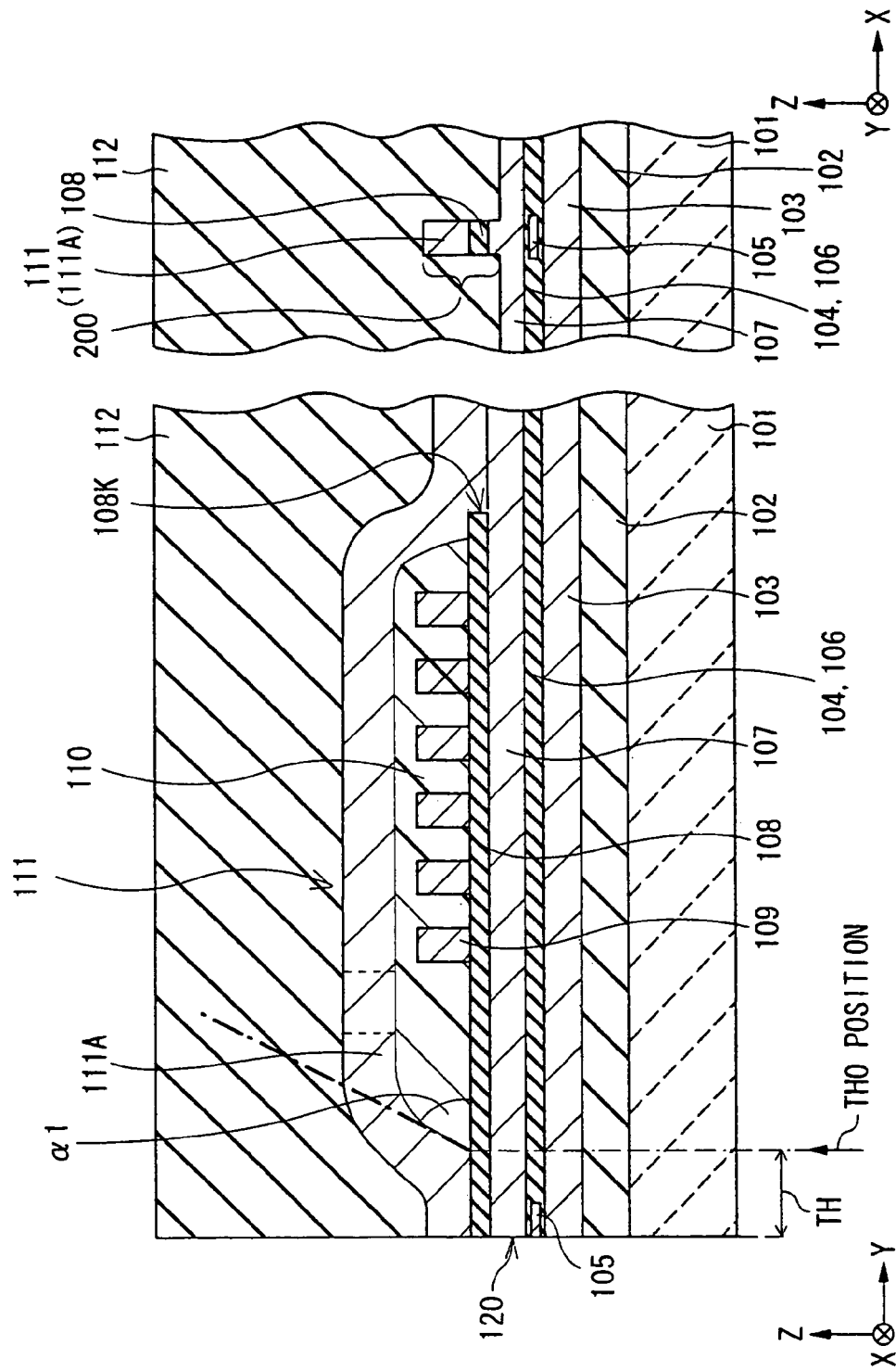
FIG. 25A and FIG. 25B are cross sectional views illustrating a cross sectional structure of a conventional thin film magnetic head.
Figures 26A, 26B:
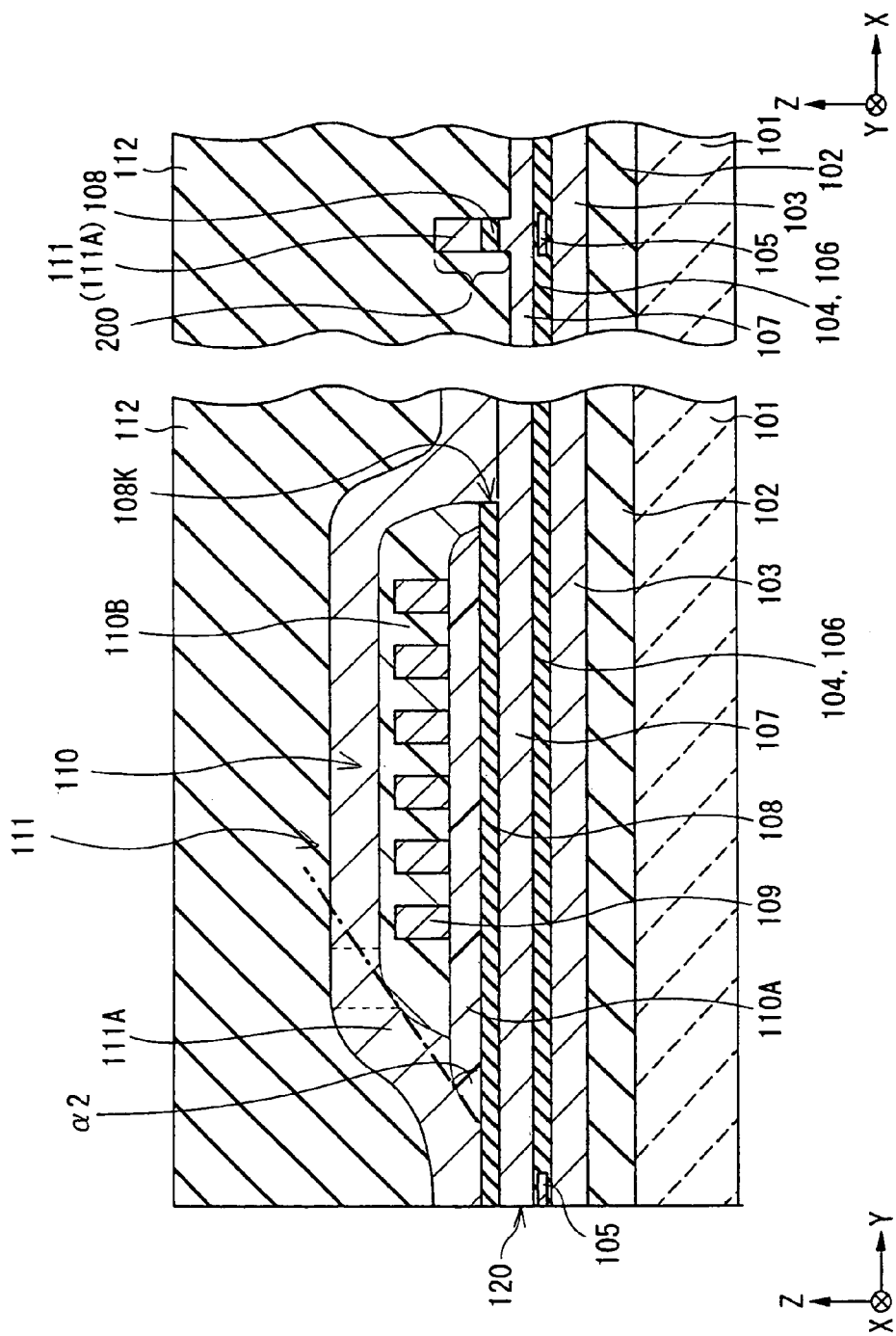
FIG. 26A and FIG. 26B are cross sectional views illustrating a cross sectional structure of another conventional thin film magnetic head.

FIG. 16A to FIG. 24 are the views for describing a method of manufacturing a composite thin film magnetic head as the method of manufacturing a thin film magnetic head of this embodiment. More specifically, an insulating layer portion 10C having a structure similar to that of the insulating layer portion 10A of the above-described first embodiment is mainly described with reference to these figures. FIG. 16A, FIG. 17A, FIG. 18A, FIG. 19A, FIG. 20A, and FIG. 21A each illustrate a cross section perpendicular to the air bearing surface, while each of FIG. 16B, FIG. 17B, FIG. 18B, FIG. 19B, FIG. 20B, and FIG. 21B illustrates a cross section of a pole portion in parallel to the air bearing surface. FIG. 22, FIG. 23, and FIG. 24 illustrate planar structures corresponding to the cross sectional structures shown in FIG. 18A and FIG. 18B, FIG. 19A and FIG. 19B, and FIG. 20A and FIG. 20B, respectively. It should be noted, however, that only major components are illustrated in FIG. 22 to FIG. 24 among the components shown in FIG. 18A to FIG. 20B, and the elements in FIG. 16A to FIG. 24 same as the components in the first embodiment are labeled with the same reference numerals and characters.

Since the steps up to the step of forming the thin film coil 9 shown in FIG. 16A and FIG. 16B in the method of manufacturing a thin film magnetic head according to this embodiment are the same as those up to the corresponding step of the above-described first embodiment shown in FIG. 1A and FIG. 1B, description thereof will be omitted.

According to this embodiment, after the thin film coil 9 is formed, an organic insulating material, such as photoresist, is applied over the entire surface of the layer structure as mentioned above, to thereby form a precursor insulating layer 10CZ as shown in FIG. 16A. Unlike the above-described first embodiment where the insulating layer portion 10A is formed by high-precision photolithography (see FIG. 3A and FIG. 3B), the precursor insulating layer 10CZ is patterned so as to leave only a region in the periphery of the thin film coil 9 without providing the opening 10AZK.

Figures 17A, 17B:
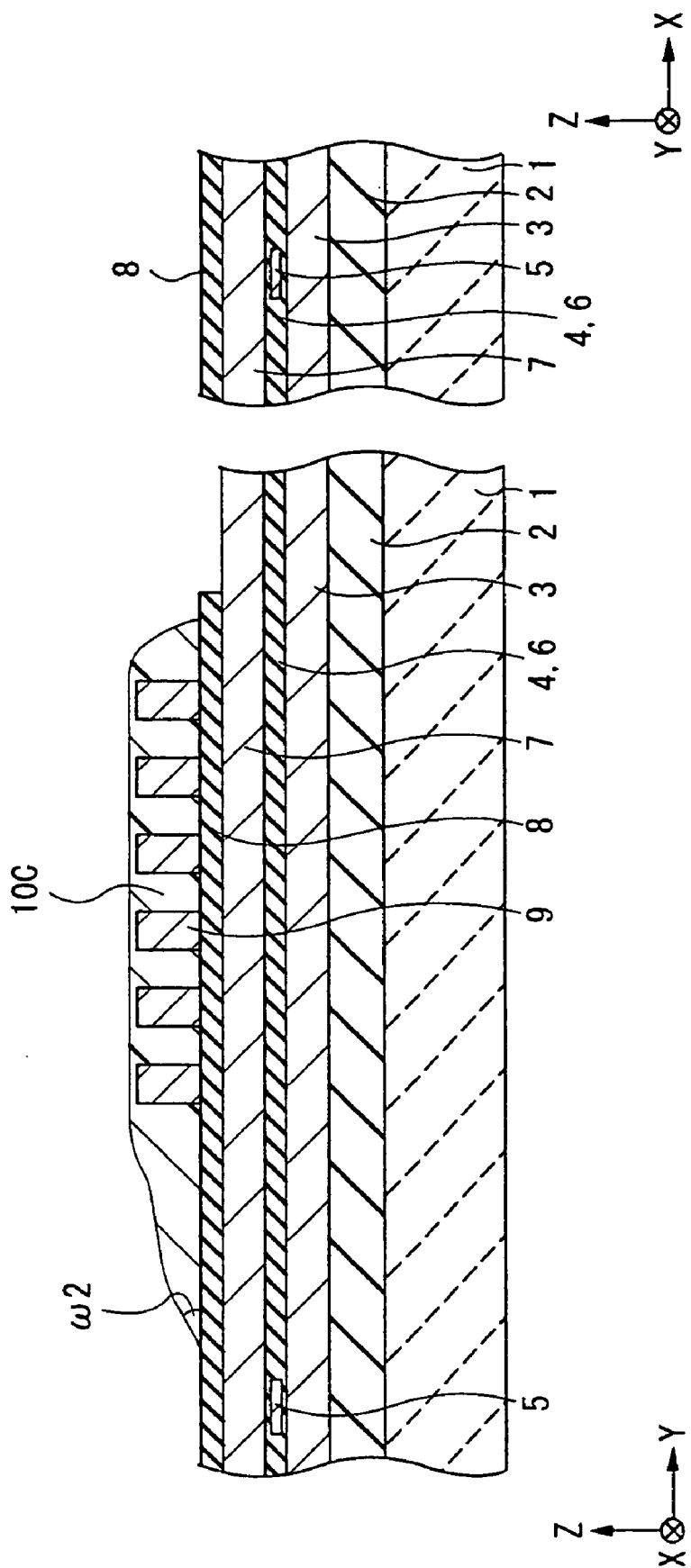
FIG. 17A and FIG. 17B are cross sectional views for describing a step subsequent to the step shown in FIG. 16A and FIG. 16B.

The precursor insulating layer 10CZ formed of photoresist is then subjected to a heat treatment at a temperature in the range of approximately 200° C. to 250° C. Through this heat treatment, each gap between turns of the thin film coil 9 is completely filled in, as shown in FIG. 17A, by the fluidizing photoresist, so that the insulating layer portion 10C is selectively formed. This insulating layer portion 10C has a step corresponding to a difference in level at the underlying layers (the write gap layer 8, the thin film coil 9, and the like), and a surface in the vicinity of the edge thereof is formed as a rounded slope due to the fluidizing photoresist. It should be noted that, in forming the insulating layer portion 10C, preferably the portion of the insulating layer portion 10C located over the thin film coil 9, for example, has a thickness reduced to the extent that exposure of the thin film coil 9 can be avoided to minimize an angle ω2 between the planar underlying layer (write gap layer 8) and the front slope, similarly to the case where the insulating layer portion 10A is formed in the above-described first embodiment.

After, for example, photoresist is applied to cover the insulating layer portion 10C and its peripheral region to form a photoresist film, the thus formed photoresist film is patterned by photolithography, thereby forming a mask 30 having an opening 30K in, for example, the rectangular shape as illustrated in FIG. 18A, FIG. 18B, and FIG. 22. When the mask 30 is formed, the opening 30K is aligned to the position where an opening 10CK (see FIG. 19A and FIG. 23) will be formed in the insulating layer portion 10C at a later step.

Figures 19A, 19B:
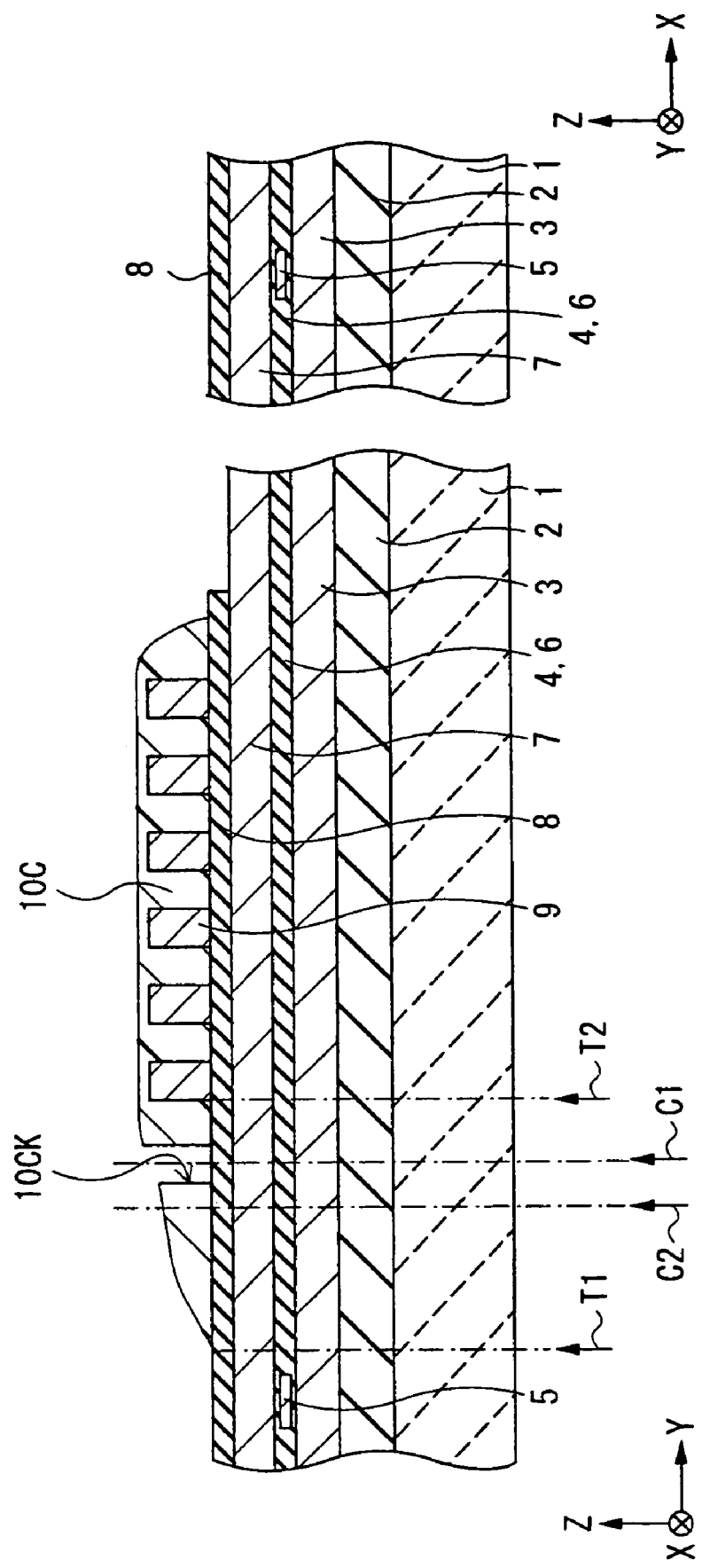
FIG. 19A and FIG. 19B are cross sectional views for describing a step subsequent to the step shown in FIG. 18A and FIG. 18B.
Figures 20A, 20B:
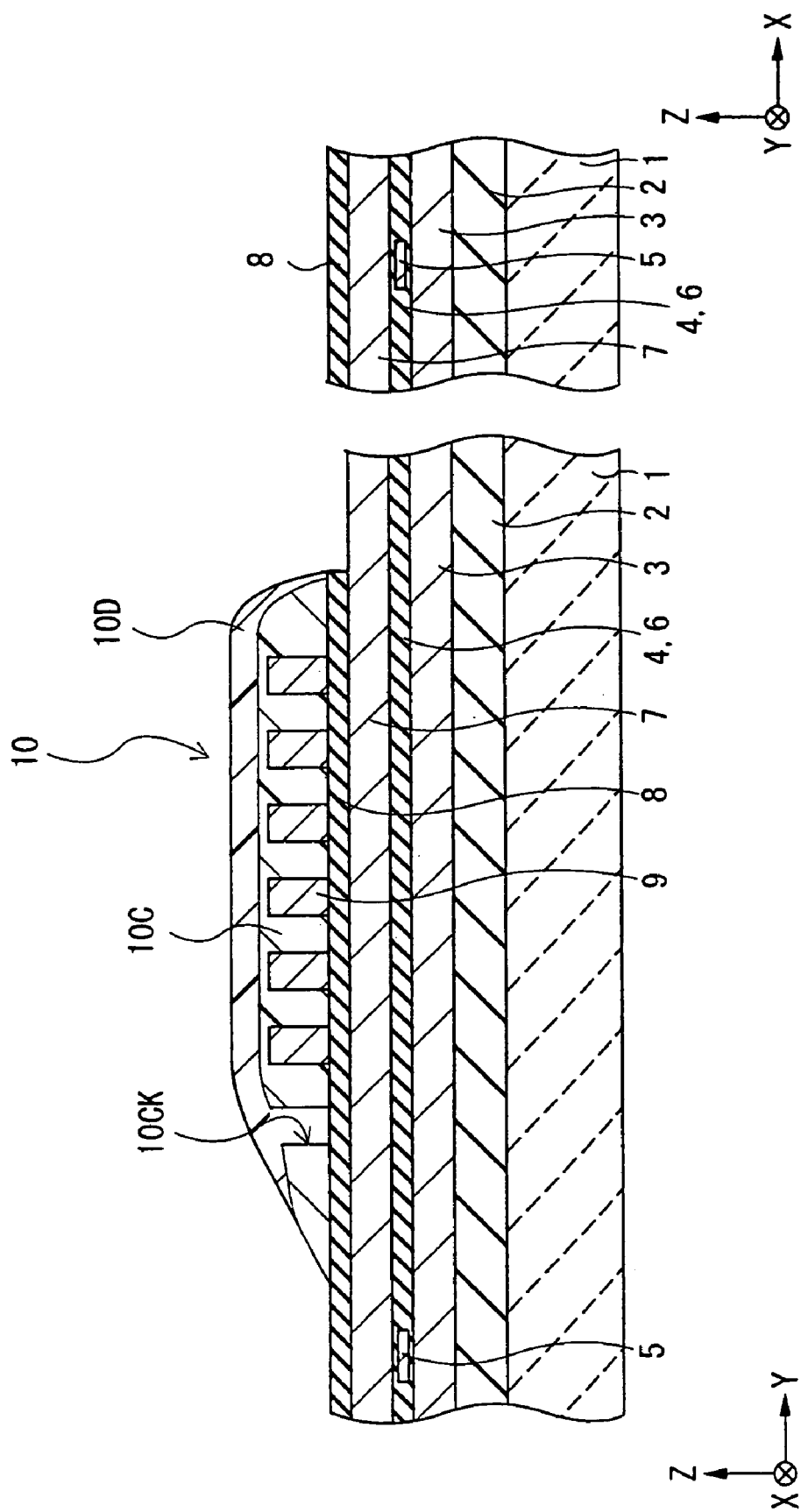
FIG. 20A and FIG. 20B are cross sectional views for describing a step subsequent to the step shown in FIG. 19A and FIG. 19B.

Using the mask 30, an etching process, such as RIE, is performed on the entire surface, thereby selectively removing the portion of the insulating layer portion 10C corresponding to the opening 30K of the mask 30 to selectively form the opening 10CK of the insulating layer portion 10C (see FIG. 19A and FIG. 23). The opening 10CK is formed at such a position that, for example, the center C1 of the opening 10CK is positioned behind the center C2 of the region between the position T1 of the front end of the insulating layer portion 10C and the position T2 of the front end of the thin film coil 9, similarly to the case where the opening 10AK is formed in the insulating layer portion 10A in the first embodiment. It should be noted that the insulating layer portion 10C having the opening 10CK mainly corresponds to one specific example of a "first insulating layer portion" in claim 4 of the present invention.

Similarly to formation of the insulating layer portion 10B in the above-described first embodiment, a precursor insulating layer is formed covering only the region in the periphery of the thin film coil 9 by high-precision photolithography and subjected to a heat treatment, thereby selectively forming an insulating layer portion 10D so that the surface of the insulating layer portion 10D located in the vicinity of the front edge thereof forms a slope continued from the slope of the insulating layer portion 10C on the front side. Consequently, the insulating layer 10 composed of the insulating layer portions 10C and 10D is formed. It should be noted that the insulating layer portion 10D mainly corresponds to one specific example of a "second insulating layer portion" in claim 4 of the invention, and the insulating layer 10 composed of the insulating layer portions 10C and 10D corresponds to one specific-example of an "insulating layer" of the invention.

The step of forming the top pole 11 after the insulating layer 10 is formed and those following this step are the same as the steps shown in FIG. 6A and FIG. 6B and the following figures, and therefore description thereof will be omitted. The cross sectional structures of the completed thin film magnetic head are shown in FIG. 21A and FIG. 21B.

According to the method of manufacturing a thin film magnetic head of this embodiment as well, the opening 10CK is formed in the insulating layer portion 10C by etching, and therefore formation of a step at the apex portion can be avoided to minimize the apex angle θ2 (θ2≈ω2), due to the effects similar to those in the above-described first embodiment where the opening 10AK is formed in the insulating layer portion 10A. As a result, the pole portion 100 having a very small uniform width can be formed with high precision.

While the invention has been described in the context of the embodiments, the invention is not limited to the above-described embodiments and can be varied in numerous ways. For example, the shape, size, manufacturing method, material, and the like of a series of components constituting the thin film magnetic head are not necessarily limited to those described in the above embodiments, and variations are possible as desired as long as the characteristics in structure, material, and the like of the respective components can be obtained.

As described above, according to the method of manufacturing a thin film magnetic head or the thin film magnetic head of the invention, an insulating layer composed of a first insulating layer portion having an opening in a region between a thin film coil and a recording-medium-facing surface and covering the thin film coil and a second insulating layer portion covering the entire first insulating layer portion including the opening, and one of the two magnetic layers is then formed to cover this insulating layer. Such a configuration makes it possible to avoid creation of a step at an apex portion and to reduce an apex angle, which is one of the factors determining the performance of a recording head, so that one of the magnetic layers can be formed with high precision and also a magnetic pole having a very small uniform width can be formed with high precision.

Especially, when the opening is formed so that the center of the opening is located on the side closer to the thin film coil than the center of a region extending between the thin film coil and the edge of the first insulating layer portion located on the recording-medium-facing surface side in the second step, the apex angle can be further reduced as compared to a configuration where the center of the opening is located on the side farther from the thin film coil than the center of the region extending between the thin film coil and the edge of the first insulating layer portion located on the recording-medium-facing surface side.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head including: two magnetic layers magnetically coupled to each other and having two magnetic poles which face each other with a gap layer in between near and in a recording-medium-facing surface to be faced with a recording medium, a thin film coil provided between the two magnetic layers, and an insulating layer for insulating the thin film coil from the two magnetic layers, wherein the insulating layer including:
   a first insulating layer portion provided to cover the thin film coil and having an opening at a region between the thin film coil and the recording-medium-facing surface; and
   a second insulating layer portion provided to cover the entire first insulating layer portion including the opening;
   one of the two magnetic layers being provided to cover the insulating layer including the first and second insulating layer portions.

* * * * *

UNITED STATES PATENT AND TRADEMARK OFFICE
CERTIFICATE OF CORRECTION

PATENT NO. : 7,092,207 B2  Page 1 of 1
APPLICATION NO. : 10/864008
DATED : August 15, 2006
INVENTOR(S) : Naoto Matono It is certified that error appears in the above-identified patent and that said Letters Patent is hereby corrected as shown below:

On First Page Item (56) References Cited, there should be:
--FOREIGN PATENT DOCUMENTS
JP 2000-251220.....9/2000
JP 2000-207711.....7/2000--

| | |
|---|---|
| Column 2, Line 40 | "layer 10" should be --layer 110-- |
| Column 7, Line 63 | "after subjected" should be --after being subjected-- |
| Column 8, Line 42 | delete "claim 3 of the invention" (THERE IS NO CLAIM 3) |
| Column 9, Line 55 | "top pole 1" should be --top pole 11-- |
| Column 10, Line 27 | "TH0" should be --TH0-- |
| Column 10, Line 29 | "TH0" should be --TH0-- |
| Column 11, Line 39 | "angle 01" should be --angle 1-- |
| Column 14, Line 29 | ""...portion" in Claim 4 of the present invention." should be --"...portion."-- |
| Column 14, Line 43 | ""...portion" in Claim 4 of the invention," should be --...portion,"-- |

Signed and Sealed this

Twenty-second Day of December, 2009

David J. Kappos
*Director of the United States Patent and Trademark Office*